(12) United States Patent
Yoshioka et al.

(10) Patent No.: US 12,464,499 B2
(45) Date of Patent: Nov. 4, 2025

(54) TERMINAL AND RADIO COMMUNICATION METHOD TO IMPROVE THE EFFICIENCY OF COMMUNICATION BY COORDINATING OPERATIONS BETWEEN THE TERMINALS

(71) Applicant: NTT DOCOMO, INC., Tokyo (JP)

(72) Inventors: Shohei Yoshioka, Tokyo (JP); Naoya Shibaike, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 373 days.

(21) Appl. No.: 18/006,799

(22) PCT Filed: Jul. 20, 2021

(86) PCT No.: PCT/JP2021/027214
§ 371 (c)(1),
(2) Date: Jan. 25, 2023

(87) PCT Pub. No.: WO2022/038952
PCT Pub. Date: Feb. 24, 2022

(65) Prior Publication Data
US 2023/0269706 A1 Aug. 24, 2023

(30) Foreign Application Priority Data
Aug. 18, 2020 (JP) .................................. 2020-138279

(51) Int. Cl.
*H04W 72/04* (2023.01)
*H04L 1/18* (2023.01)
*H04W 92/18* (2009.01)

(52) U.S. Cl.
CPC ............... *H04W 72/04* (2013.01); *H04L 1/18* (2013.01); *H04W 92/18* (2013.01)

(58) Field of Classification Search
CPC ....... H04W 72/04; H04W 92/18; H04W 4/40; H04W 72/25; H04W 72/0406;
(Continued)

(56) References Cited

U.S. PATENT DOCUMENTS

2019/0387377 A1\* 12/2019 Zhang ................. H04W 52/383
2020/0314804 A1\* 10/2020 Shin ...................... H04L 5/0055
(Continued)

FOREIGN PATENT DOCUMENTS

CN          110999335 A       4/2020
WO     WO 2020/015345 A1 *  1/2020

OTHER PUBLICATIONS

3GPP TSG RAN WG1 #102-e R1-2005840 "Sidelink resource allocation for Reliability enhancement" Lenovo, Motorola Mobility; E-meeting; Aug. 17-28, 2020 (3 pages).
(Continued)

*Primary Examiner* — Rushil P. Sampat
(74) *Attorney, Agent, or Firm* — Osha Bergman Watanabe & Burton LLP

(57) ABSTRACT

A disclosed terminal includes a transmitter configured to transmit information relating to resource selection to another terminal via a resource relating to a HARQ (Hybrid automatic repeat request) feedback channel; and a receiver configured to receive data from the another terminal via a resource determined based on the information relating to the resource selection, wherein the information relating to the resource selection includes at least one of a sensing result, information indicating a resource determined based on sensing, an indication of re-evaluation or re-selection, or a sidelink grant.

8 Claims, 18 Drawing Sheets

(58) Field of Classification Search
CPC ....... H04W 72/20; H04W 28/26; H04W 4/70; H04W 72/02; H04W 72/0446; H04W 72/1263; H04W 72/541; H04W 72/569; H04W 76/14; H04L 1/18
See application file for complete search history.

(56) References Cited

U.S. PATENT DOCUMENTS

| | | | |
|---|---|---|---|
| 2021/0136744 A1* | 5/2021 | Lu | H04W 72/20 |
| 2021/0176027 A1 | 6/2021 | Desai et al. | |
| 2022/0232575 A1* | 7/2022 | Lee | H04W 72/56 |
| 2022/0255680 A1* | 8/2022 | Moon | H04W 72/21 |
| 2022/0400477 A1* | 12/2022 | Lee | H04W 72/20 |
| 2023/0164816 A1* | 5/2023 | Hwang | H04W 72/40 370/330 |

OTHER PUBLICATIONS

3GPP TS 38.211 V16.2.0 "3rd Generation Partnership Project; Technical Specification Group Radio Access Network; NR; Physical channels and modulation (Release 16)" Jun. 2020 (131 pages).
3GPP TR 22.886 V15.1.0 "3rd Generation Partnership Project; Technical Specification Group Services and System Aspects; Study on enhancement of 3GPP Support for 5G V2X Services (Release 15)" Mar. 2017 (58 pages).
International Search Report issued in International Application No. PCT/JP2021/027214, mailed Sep. 21, 2021 (3 pages).
Written Opinion issued in International Application No. PCT/JP2021/027214; Dated Sep. 21, 2021 (4 pages).
Office Action issued in Chinese Patent Application No. 202180055709.X, issued Mar. 28, 2025 (17 pages).

* cited by examiner

FIG.18
Cyclic shift: $m_{CS} + m_0$
| Y | $m_{CS}$ |
|---|---|
| 1 | 0 |
| 2 | 0, 3 |
| 3 | 0, 2, 4 |
| 6 | 0, 1, 2, 3, 4, 5 |
| Info. | $m_0$ |
|---|---|
| NACK | 0 |
| ACK | 6 |
(Y: sl-NumMuxCS-Pair)
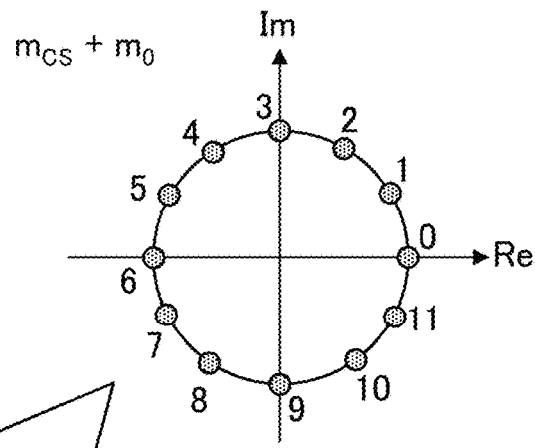
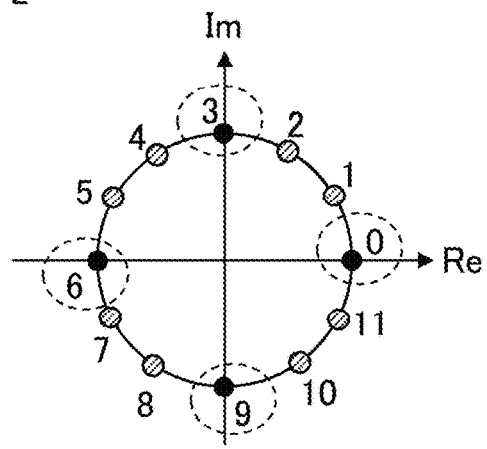
e.g. Y = 2

TERMINAL AND RADIO COMMUNICATION METHOD TO IMPROVE THE EFFICIENCY OF COMMUNICATION BY COORDINATING OPERATIONS BETWEEN THE TERMINALS

FIELD OF THE INVENTION

The present invention relates to a terminal and a communication method in a radio communication system.

BACKGROUND ART

In long term evolution (LTE) and the successor system of LTE (for example, LTE advanced (LTE-A) and new radio (NR) (also referred to as 5G)), a device to device (D2D) technology has been discussed in which terminals perform direct communication with each other without using a base station (for example, Non-Patent Document 1).

D2D reduces traffic between the terminal and the base station, and enables communication between the terminals even when the base station is in a state where communication is not available during a disaster. Note that, in a 3rd generation partnership project (3GPP), D2D is referred to as a "sidelink", but herein, the more general term D2D is used. Here, in the description of the following embodiment, the term "sidelink" is also used as necessary.

D2D communication is classified broadly into D2D discovery for discovering other terminals that are capable of performing communication and D2D communication for performing direct communication between terminals (also referred to as D2D direct communication, terminal-to-terminal direct communication, and the like). Hereinafter, when D2D communication, D2D discovery, and the like are not particularly distinguished from each other, the D2D communication, the D2D discovery, and the like will be simply referred to as D2D. In addition, a signal to be transmitted and received in D2D will be referred to as a D2D signal. Various use cases of a service according to vehicle to everything (V2X) in NR have been discussed (for example, Non-Patent Document 2).

CITATION LIST

Non-Patent Document

Non-Patent Document 1: 3GPP TS 38.211 V16.2.0 (2020-06)
Non-Patent Document 2: 3GPP TR 22.886 V15.1.0 (2017-03)

SUMMARY OF THE INVENTION

Problem to be Solved by the Invention

The Enhanced Ultra Reliable Low Latency Communication (eURLLC) is being discussed to enhance the NR Sidelink. For example, it is assumed that the communication quality can be improved by receiving information relating to a resource used from another terminal through coordination between terminals and executing resource selection based on the information. However, no specific method has been defined for sharing information with another terminal.

The present invention has been made in view of the above points, and is intended to improve the efficiency of communication by performing inter-terminal coordinated operations in direct communication between terminals.

Solution to Problem

According to the disclosed technique, a terminal is provided. The terminal includes a transmitter configured to transmit information relating to resource selection to another terminal via a resource relating to a HARQ (Hybrid automatic repeat request) feedback channel; and a receiver configured to receive data from the another terminal via a resource determined based on the information relating to the resource selection, wherein the information relating to the resource selection includes at least one of a sensing result, information indicating a resource determined based on sensing, an indication of re-evaluation or re-selection, or a sidelink grant.

Advantageous Effects of Invention

According to the disclosed technique, in the direct communication between terminals, it is possible to improve the efficiency of communication by coordinating operations between the terminals.

BRIEF DESCRIPTION OF THE DRAWINGS

FIG. 18 A drawing illustrating an example (2) of resources used for terminal-to-terminal coordination according to an embodiment of the present invention.

DETAILED DESCRIPTION OF THE PREFERRED EMBODIMENTS

Hereinafter, an embodiment of the invention will be described with reference to the drawings. Note that, the embodiment described below is an example, and an embodiment to which the invention is applied is not limited to the following embodiment.

In the operation of a radio communication system of the embodiment of the invention, the conventional technology is suitably used. However, the conventional technology, for example, is the conventional LTE, but is not limited to the conventional LTE. In addition, the term "LTE" used herein has a broad meaning including LTE-advanced and a scheme subsequent to the LTE-advanced (for example, NR), or a wireless local area network (LAN), unless otherwise noted.

In addition, in the embodiment of the invention, a duplex may be a time division duplex (TDD), may be a frequency division duplex (FDD), or may be other schemes (for example, a flexible duplex or the like).

In addition, in the embodiment of the invention, "configuring" a radio parameter or the like may mean pre-configuring a predetermined value, or may be configuring a radio parameter that is indicated by a base station 10 or a terminal 20.

Figure 1:
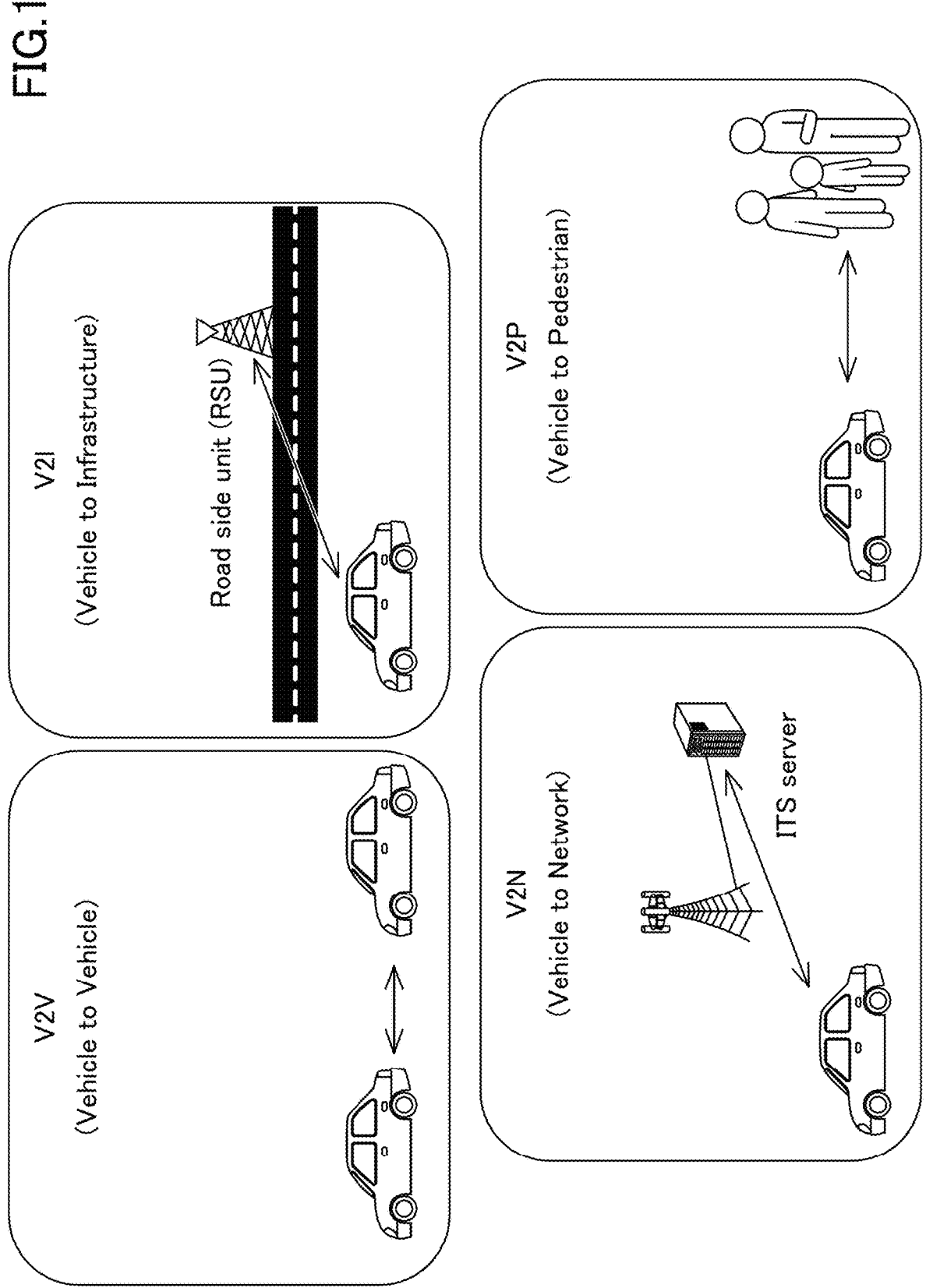
FIG. 1 A diagram illustrating V2X.

FIG. 1 is a diagram illustrating V2X. In 3GPP, implementing vehicle to everything (V2X) or enhanced V2X (eV2X) by extending a D2D function has been discussed, and the development of specifications thereof has progressed. As illustrated in FIG. 1, V2X is a part of intelligent transport systems (ITS), and is a generic term for: vehicle to vehicle (V2V) indicating a communication mode that is performed between vehicles; vehicle to infrastructure (V2I) indicating a communication mode that is performed between a vehicle and a road-side unit (RSU) to be provided on a roadside; vehicle to network (V2N) indicating a communication mode that is performed between a vehicle and an ITS server; and vehicle to pedestrian (V2P) indicating a communication mode that is performed between a vehicle and a mobile terminal carried by a pedestrian.

In addition, in 3GPP, V2X using cellular communication and terminal-to-terminal communication of LTE or NR have been discussed. V2X using cellular communication is also referred to as cellular V2X. In V2X of NR, it has been discussed to achieve high capacity, low latency, high reliability, and quality of service (QoS) control.

Regarding V2X of LTE or NR, it is expected that discussions not limited to the 3GPP specification development will be held in the future. For example, it is expected that discussions will be held regarding: ensuring interoperability; reducing cost by implementing higher layers; a method for combined usage of, or switching between, a plurality of radio access technologies (RAT); regulation support in each country; data acquisition and delivering of a V2X platform of LTE or NR; and database management and a use method thereof.

In the embodiment of the invention, it is mainly expected that a communication device is mounted on a vehicle, but the embodiment of the invention is not limited thereto. For example, the communication device may be a terminal that is carried by a person, the communication device may be a device that is mounted on a drone or an aircraft, or the communication device may be a base station, RSU, a relay station (relay node), a terminal having scheduling capability, and the like.

Note that, a sidelink (SL) may be distinguished from an uplink (UL) or a downlink (DL), based on one of the following 1) to 4) or a combination thereof. In addition, SL may be referred to as another name.

1) Resource arrangement in the time domain
2) Resource arrangement in the frequency domain
3) A synchronization signal to be referred to (including sidelink synchronization signal (SLSS))
4) A reference signal to be used in path-loss measurement for transmission power control In addition, regarding orthogonal frequency division multiplexing (OFDM) of SL or UL, any of cyclic-prefix OFDM (CP-OFDM), Discrete Fourier Transform-Spread-OFDM (DFT-S-OFDM), OFDM without transform precoding, and OFDM with transform precoding may be applied.

In SL of LTE, regarding resource allocation of SL with respect to the terminal 20, Mode 3 and Mode 4 are defined. In Mode 3, a transmission resource is more dynamically allocated by downlink control information (DCI) that is transmitted from the base station 10 to the terminal 20. In addition, in Mode 3, semi persistent scheduling (SPS) can be performed. In Mode 4, the terminal 20 autonomously selects the transmission resource from a resource pool.

Note that, a slot in the embodiment of the invention may be replaced with a symbol, a mini slot, a subframe, a radio frame, or a transmission time interval (TTI). In addition, a cell in the embodiment of the invention may be replaced with a cell group, a carrier component, BWP, a resource pool, a resource, a radio access technology (RAT), a system (including a radio LAN), and the like.

Note that, in the embodiment of the invention, the terminal 20 is not limited to a V2X terminal, and may be all types of terminals that perform D2D communication. For example, the terminal 20 may be a terminal that is carried by a user, such as a smart phone, or may be an internet of things (IoT) device such as a smart meter.

Figure 2:
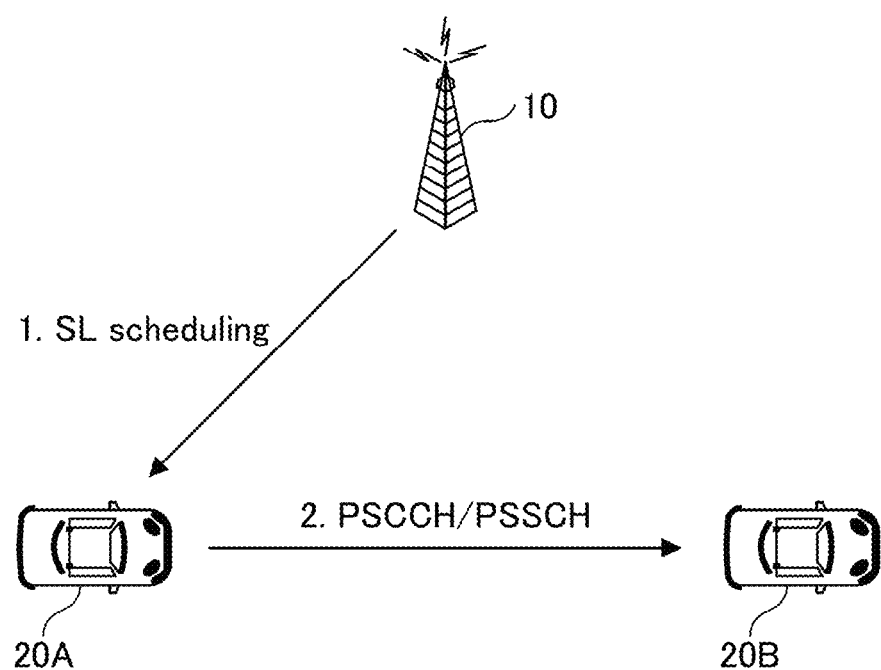
FIG. 2 A diagram illustrating Example (1) of a transmission mode of V2X.

FIG. 2 is a diagram illustrating Example (1) of a transmission mode of V2X. In the transmission mode of the sidelink communication illustrated in FIG. 2, in Step 1, the base station 10 transmits sidelink scheduling to a terminal 20A. Subsequently, the terminal 20A transmits a physical sidelink control channel (PSCCH) and a physical sidelink shared channel (PSSCH) to a terminal 20B, based on the received scheduling (Step 2). The transmission mode of the sidelink communication illustrated in FIG. 2 may be referred to as a sidelink transmission mode 3 in LTE. In the sidelink transmission mode 3 in LTE, Uu based sidelink scheduling is performed. Uu is a radio interface between a universal terrestrial radio access network (UTRAN) and a user equipment (UE). Note that, the transmission mode of the sidelink communication illustrated in FIG. 2 may be referred to as a sidelink transmission mode 1 in NR.

Figure 3:
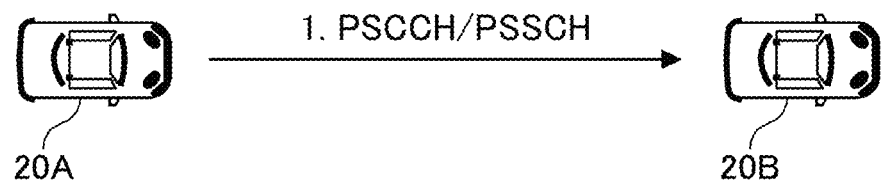
FIG. 3 A diagram illustrating Example (2) of the transmission mode of V2X.

FIG. 3 is a diagram illustrating Example (2) of the transmission mode of V2X. In the transmission mode of the sidelink communication illustrated in FIG. 3, in Step 1, the terminal 20A transmits PSCCH and PSSCH to the terminal 20B by using the autonomously selected resource. The transmission mode of the sidelink communication illustrated in FIG. 3 may be referred to as a sidelink transmission mode 4 in LTE. In the sidelink transmission mode 4 in LTE, the UE itself executes resource selection.

Figure 4:
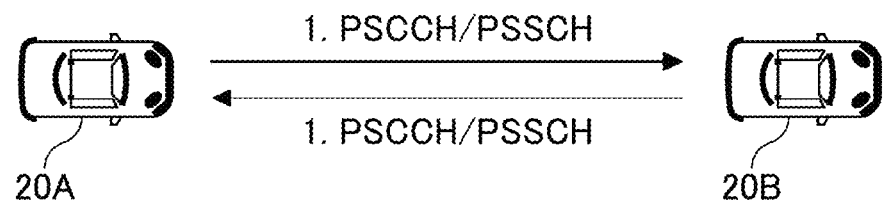
FIG. 4 A diagram illustrating Example (3) of the transmission mode of V2X.

FIG. 4 is a diagram illustrating Example (3) of the transmission mode of V2X. In the transmission mode of the sidelink communication illustrated in FIG. 4, in Step 1, the terminal 20A transmits PSCCH and PSSCH to the terminal 20B by using the autonomously selected resource. Similarly, the terminal 20B transmits PSCCH and PSSCH to the terminal 20A by using the autonomously selected resource (Step 1). The transmission mode of the sidelink communication illustrated in FIG. 4 may be referred to as a sidelink transmission mode 2a in NR. In the sidelink transmission mode 2 in NR, the terminal 20 itself executes the resource selection.

Figure 5:
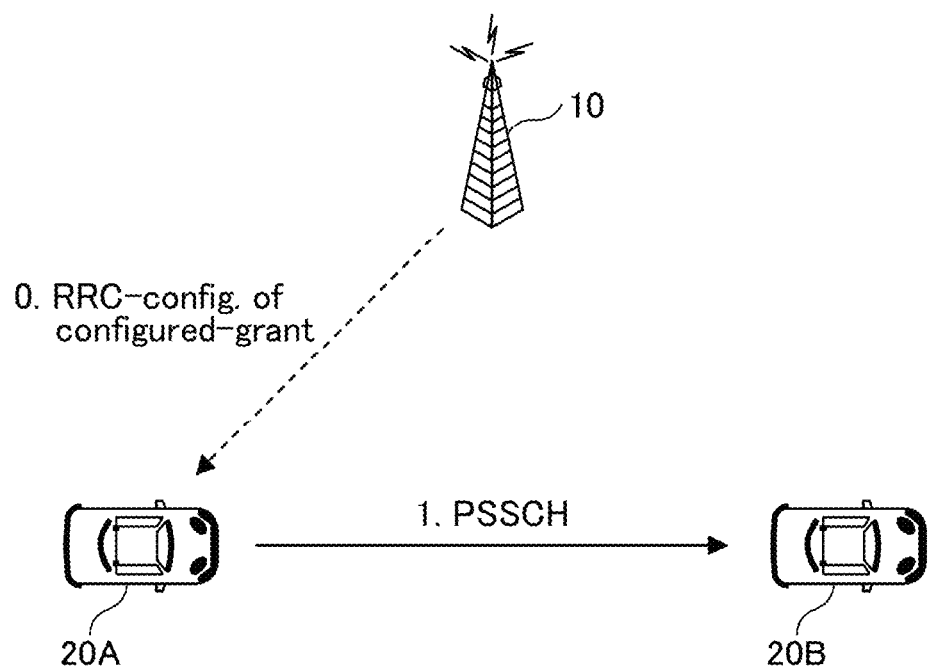
FIG. 5 A diagram illustrating Example (4) of the transmission mode of V2X.

FIG. 5 is a diagram illustrating Example (4) of the transmission mode of V2X. In the transmission mode of the sidelink communication illustrated in FIG. 5, in Step 0, the base station 10 transmits the grant of the sidelink to the terminal 20A through radio resource control (RRC) configuration. Subsequently, the terminal 20A transmits PSSCH to the terminal 20B, based on the received resource pattern (Step 1). The transmission mode of the sidelink communication illustrated in FIG. 5 may be referred to as a sidelink transmission mode 2c in NR.

Figure 6:
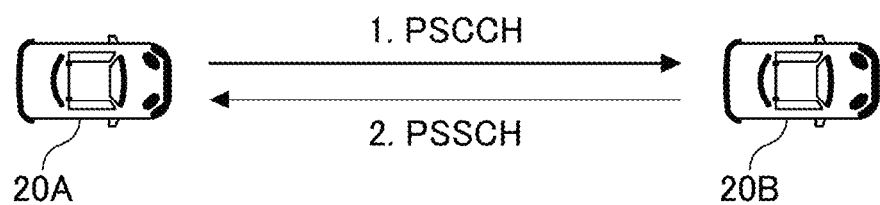
FIG. 6 A diagram illustrating Example (5) of the transmission mode of V2X.

FIG. 6 is a diagram illustrating Example (5) of the transmission mode of V2X. In the transmission mode of the sidelink communication illustrated in FIG. 6, in Step 1, the terminal 20A transmits the sidelink scheduling to the terminal 20B through PSCCH. Subsequently, the terminal 20B transmits the PSSCH to the terminal 20A, based on the received scheduling (Step 2). The transmission mode of the sidelink communication illustrated in FIG. 6 may be referred to as a sidelink transmission mode 2d in NR.

Figure 7:
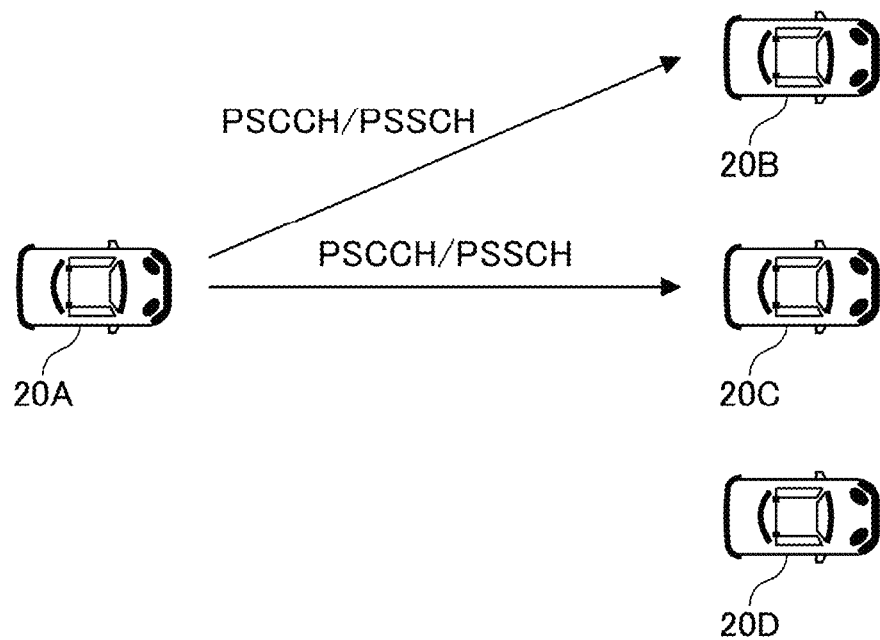
FIG. 7 A diagram illustrating Example (1) of a communication type of V2X.

FIG. 7 is a diagram illustrating Example (1) of a communication type of V2X. The communication type of the sidelink illustrated in FIG. 7 is unicast. The terminal 20A transmits PSCCH and PSSCH to the terminal 20. In the example illustrated in FIG. 7, the terminal 20A performs unicast with respect to the terminal 20B, and performs unicast with respect to a terminal 20C.

Figure 8:
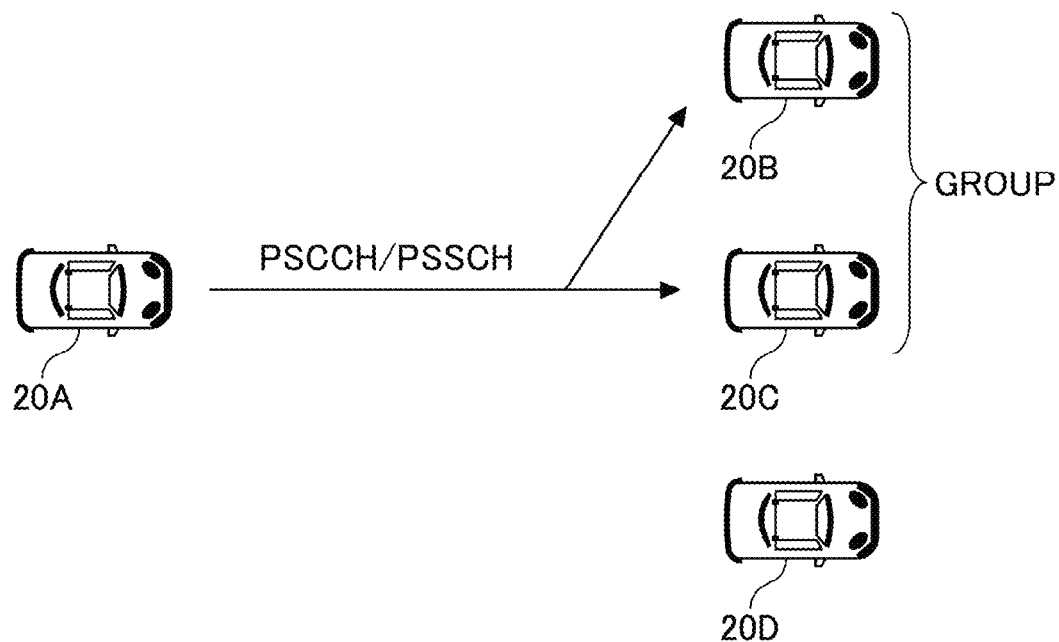
FIG. 8 A diagram illustrating Example (2) of the communication type of V2X.

FIG. 8 is a diagram illustrating Example (2) of the communication type of V2X. The communication type of the sidelink illustrated in FIG. 8 is groupcast. The terminal 20A transmits PSCCH and PSSCH to a group to which one or a plurality of terminals 20 belong. In the example illustrated in FIG. 8, the group includes the terminal 20B and the terminal 20C, and the terminal 20A performs groupcast with respect to the group.

Figure 9:
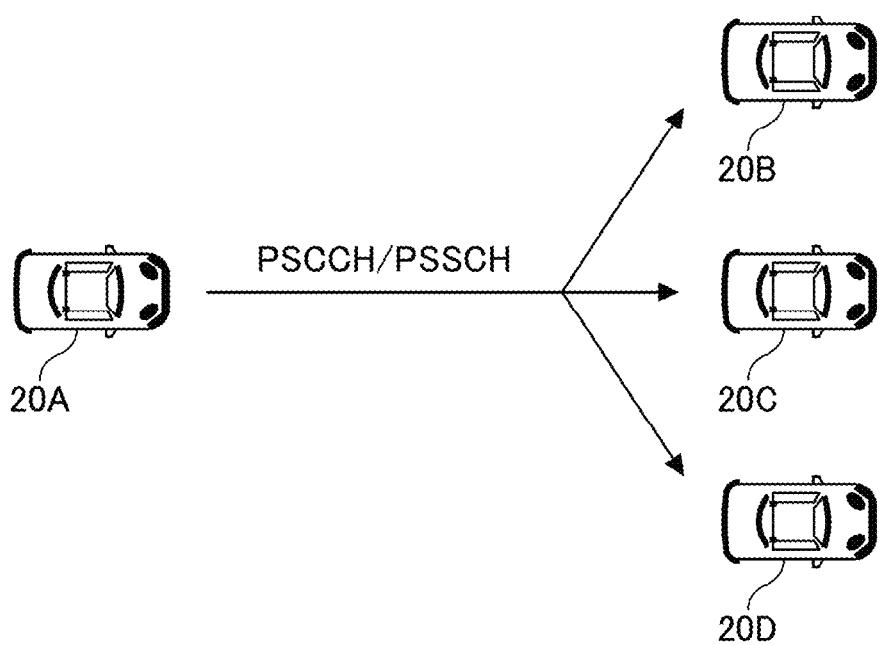
FIG. 9 A diagram illustrating Example (3) of the communication type of V2X.

FIG. 9 is a diagram illustrating Example (3) of the communication type of V2X. The communication type of the sidelink illustrated in FIG. 9 is broadcast. The terminal 20A transmits PSCCH and PSSCH to one or a plurality of terminals 20. In the example illustrated in FIG. 9, the terminal 20A performs broadcast with respect to the terminal 20B, the terminal 20C, and a terminal 20D. Note that, the terminal 20A illustrated in FIG. 7 to FIG. 9 may be referred to as a header-UE.

In addition, in NR-V2X, it is expected that a hybrid automatic repeat request (HARQ) is supported by the unicast and the groupcast of the sidelink. Further, in NR-V2X, sidelink feedback control information (SFCI) including a HARQ response is defined. Further, it is discussed that SFCI is transmitted through a physical sidelink feedback channel (PSFCH).

Note that, in the following description, in the transmission of HARQ-ACK in the sidelink, PSFCH is used, which is an example. For example, the transmission of HARQ-ACK in the sidelink may be performed by using PSCCH, the transmission of HARQ-ACK in the sidelink may be performed by using PSSCH, or the transmission of HARQ-ACK in the sidelink may be performed by using another channel.

Hereinafter, for convenience sake, the overall information that is reported by the terminal 20 in HARQ will be referred to as HARQ-ACK. Such HARQ-ACK may be referred to as HARQ-ACK information. In addition, more specifically, a codebook to be applied to the HARQ-ACK information that is reported to the base station 10 and the like from the terminal 20 will be referred to as a HARQ-ACK codebook. The HARQ-ACK codebook defines a bit sequence of the HARQ-ACK information. Note that, not only ACK but also NACK are transmitted by "HARQ-ACK".

Figure 10:
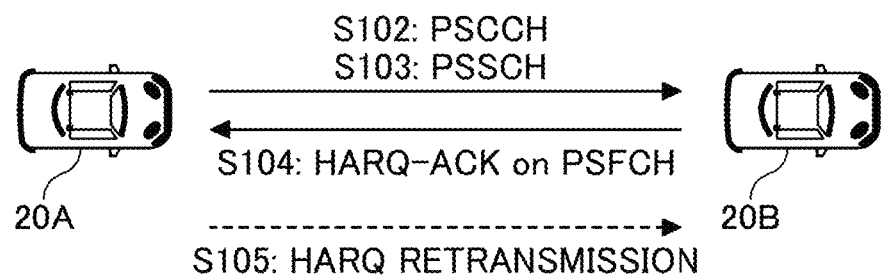
FIG. 10 A sequence diagram illustrating Operation Example (1) of V2X.

FIG. 10 is a sequence diagram illustrating Operation Example (1) of V2X. As illustrated in FIG. 10, the radio communication system according to the embodiment of the invention may include the terminal 20A and the terminal 20B. Note that, in practice, there are a plurality of user equipment, and, as the example of FIG. 10, the terminal 20A and the terminal 20B are illustrated.

Hereinafter, when the terminals 20A and 20B, and the like are not particularly distinguished from each other, the terminals 20A and 20B, and the like will be simply described as the "terminal 20" or the "user equipment". In FIG. 10, as an example, a case where both the terminal 20A and the terminal 20B are within the coverage of the cell is illustrated, but the operation of the embodiment of the invention can also be applied to a case where the terminal 20B is out of the coverage.

As described above, in this embodiment, the terminal 20, for example, is a device mounted on a vehicle such as an automobile, and has a cellular communication function and a sidelink function as UE in LTE or NR. The terminal 20 may be a typical portable terminal (a smartphone and the like). In addition, the terminal 20 may be RSU. RSU described above may be UE type RSU having the function of UE, or may be gNB type RSU having the function of a base station device.

Note that, it is not necessary that the terminal 20 is to be a device with one housing, and for example, even in a case where various sensors are dispersedly arranged in a vehicle, a device including the various sensors may be the terminal 20.

In addition, processing details of the transmission data of the sidelink of the terminal 20 are basically identical to processing details of UL transmission in LTE or NR. For example, the terminal 20 scrambles and modulates a codeword of transmission data to generate complex-valued symbols, maps the complex-valued symbols (transmission signals) to one or two layers, and performs precoding. Then, the terminal 20 maps the precoded complex-valued symbols to a resource element to generate a transmission signal (Example: a complex-valued time-domain SC-FDMA signal), and transmits the transmission signal from each antenna port.

Note that, the base station 10 has a cellular communication function as a base station in LTE or NR, and a function of enabling the communication of the terminal 20 in this embodiment (Example: resource pool configuration, resource allocation, and the like). In addition, the base station 10 may be RSU (gNB type RSU).

In addition, in the radio communication system according to the embodiment of the invention, a signal waveform that is used by the terminal 20 in SL or UL may be OFDMA, may be SC-FDMA, or may be other signal waveforms.

In step S101, the terminal 20A autonomously selects a resource to be used for the PSCCH and the PSSCH from a resource selection window having a predetermined period. The resource selection window may be configured by the base station 10 to the terminal 20.

In Step S102 and Step S103, the terminal 20A transmits sidelink control information (SCI) via PSCCH and/or PSSCH, and transmits SL data via PSSCH, using the resource autonomously selected in Step S101. For example, the terminal 20A may transmit PSCCH with a time resource that is the same as at least a part of the time resource of PSSCH, using a frequency resource adjacent to a frequency resource of PSSCH.

The terminal 20B receives SCI (PSCCH and/or PSSCH) and the SL data (PSSCH) transmitted from the terminal 20A. The received SCI may include the information of the resource of PSFCH for the terminal 20B to transmit HARQ-ACK corresponding to the reception of the data. The terminal 20A may include the information of the autonomously selected resource in SCI to transmit the information.

In Step S104, the terminal 20B transmits HARQ-ACK corresponding to the received data to the terminal 20A by using the resource of PSFCH determined from the received SCI.

In Step S105, in a case where HARQ-ACK received in Step S104 indicates that retransmission is requested, that is, in a case where it is a negative response (NACK), the terminal 20A retransmits PSCCH and PSSCH to the terminal 20B. The terminal 20A may retransmit PSCCH and PSSCH by using the autonomously selected resource.

Note that, in a case where HARQ control is not executed, Step S104 and Step S105 need not be executed.

Figure 11:
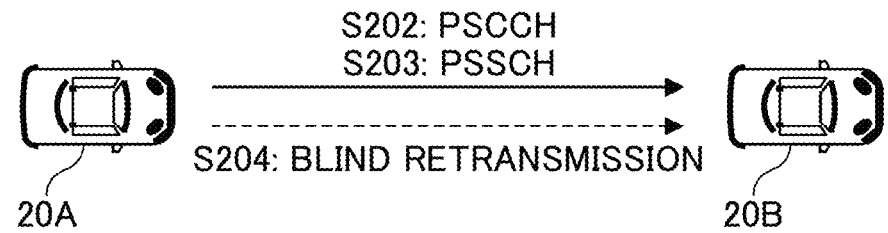
FIG. 11 A sequence diagram illustrating Operation Example (2) of V2X.

FIG. 11 is a sequence diagram illustrating Operation Example (2) of V2X. Blind retransmission, which is not based on the HARQ control, for improving a success rate or a reaching distance of the transmission may be executed.

In Step S201, the terminal 20A autonomously selects the resource that is to be used for PSCCH and PSSCH from the resource selection window having a predetermined period. The resource selection window may be configured in the terminal 20 by the base station 10.

In Step S202 and Step S203, the terminal 20A transmits SCI via PSCCH and/or PSSCH, and transmits the SL data via PSSCH, using the resource autonomously selected in Step S201. For example, the terminal 20A may transmit PSCCH with a time resource that is the same as at least a part of the time resource of PSSCH, using a frequency resource adjacent to the frequency resource of PSSCH.

In Step S204, the terminal 20A retransmits SCI via PSCCH and/or PSSCH and the SL data via PSSCH to the terminal 20B by using the resource autonomously selected in Step S201. The retransmission in Step S204 may be executed a plurality of times.

Note that, in a case where the blind retransmission is not executed, Step S204 need not be executed.

Figure 12:
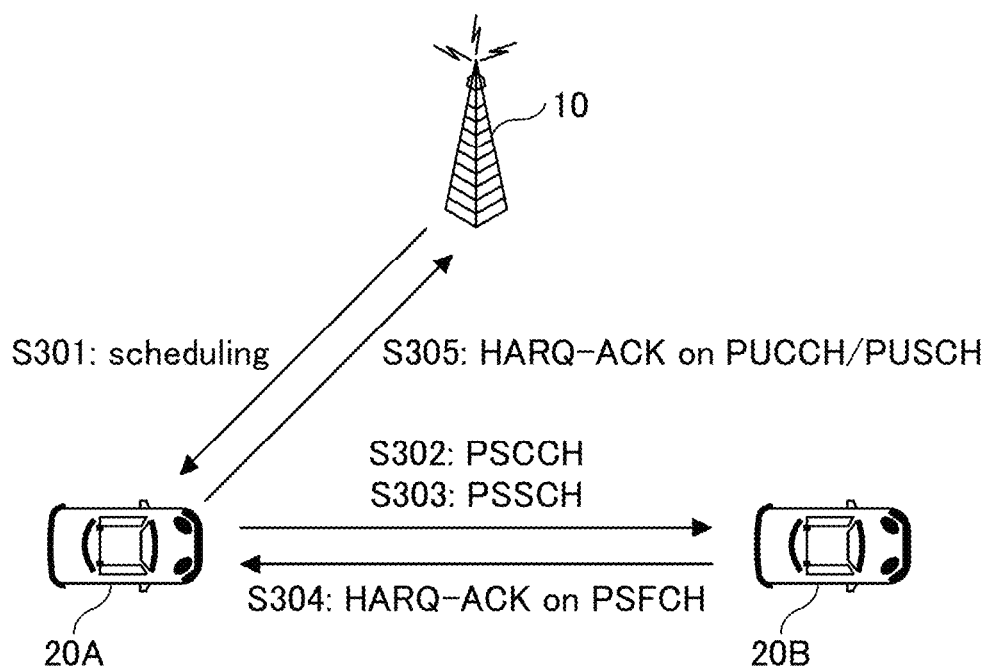
FIG. 12 A sequence diagram illustrating Operation Example (3) of V2X.

FIG. 12 is a sequence diagram illustrating Operation Example (3) of V2X. The base station 10 may perform sidelink scheduling. That is, the base station 10 may determine a resource of the sidelink that is used by the terminal 20, and may transmit information indicating the resource to the terminal 20. Further, in a case where the HARQ control is applied, the base station 10 may transmit information indicating the resource of PSFCH to the terminal 20.

In Step S301, the base station 10 sends downlink control information (DCI) to the terminal 20A via PDCCH, thereby performing the SL scheduling. Hereinafter, for convenience sake, DCI for SL scheduling will be referred to as SL scheduling DCI.

In addition, in Step S301, it is expected that the base station 10 also transmits DCI for DL scheduling (may be referred to as DL allocation) to the terminal 20A via PDCCH. Hereinafter, for convenience sake, DCI for DL scheduling will be referred to as DL scheduling DCI. The terminal 20A that has received DL scheduling DCI receives DL data via PDSCH, using a resource that is specified by DL scheduling DCI.

In Step S302 and Step S303, the terminal 20A transmits the sidelink control information (SCI) via PSCCH and/or PSSCH, and transmits the SL data via PSSCH, using the resource specified by SL scheduling DCI. Note that, in SL scheduling DCI, only the resource of PSSCH may be specified. In this case, for example, the terminal 20A may transmit PSCCH with a time resource that is the same as at least a part of the time resource of PSSCH, using a frequency resource adjacent to the frequency resource of PSSCH.

The terminal 20B receives SCI (PSCCH and/or PSSCH) and the SL data (PSSCH) transmitted from the terminal 20A. SCI received via PSCCH and/or PSSCH includes information of the resource of PSFCH for the terminal 20B to transmit HARQ-ACK corresponding to the reception of the data.

The information of the resource is included in DL scheduling DCI or SL scheduling DCI that is transmitted from the base station 10 in Step S301, and the terminal 20A acquires the information of the resource from the DL scheduling DCI or the SL scheduling DCI and includes the information in SCI. Alternatively, DCI to be transmitted from the base station 10 need not include the information of the resource, and the terminal 20A may autonomously include the information of the resource in SCI to transmit the information.

In Step S304, the terminal 20B transmits HARQ-ACK corresponding to the received data to the terminal 20A by using the resource of PSFCH determined from the received SCI.

In Step S305, the terminal 20A, for example, transmits HARQ-ACK by using a resource of a physical uplink control channel (PUCCH) specified by DL scheduling DCI (or SL scheduling DCI), and the base station 10 receives HARQ-ACK, at a timing specified by DL scheduling DCI (or SL scheduling DCI) (for example, a timing in unit of slots). In the HARQ-ACK codebook, ARQ-ACK that is generated based on HARQ-ACK that is received from the terminal 20B or based on PSFCH that is not received from the terminal 20B, and HARQ-ACK corresponding to the DL data can be included. Here, in a case where there is no allocation of the DL data, HARQ-ACK corresponding to the DL data is not included. In NR Rel.16, in the HARQ-ACK codebook, HARQ-ACK corresponding to the DL data is not included.

Note that, in a case where the HARQ control is not executed, Step S304 and Step S305 need not be executed.

Figure 13:
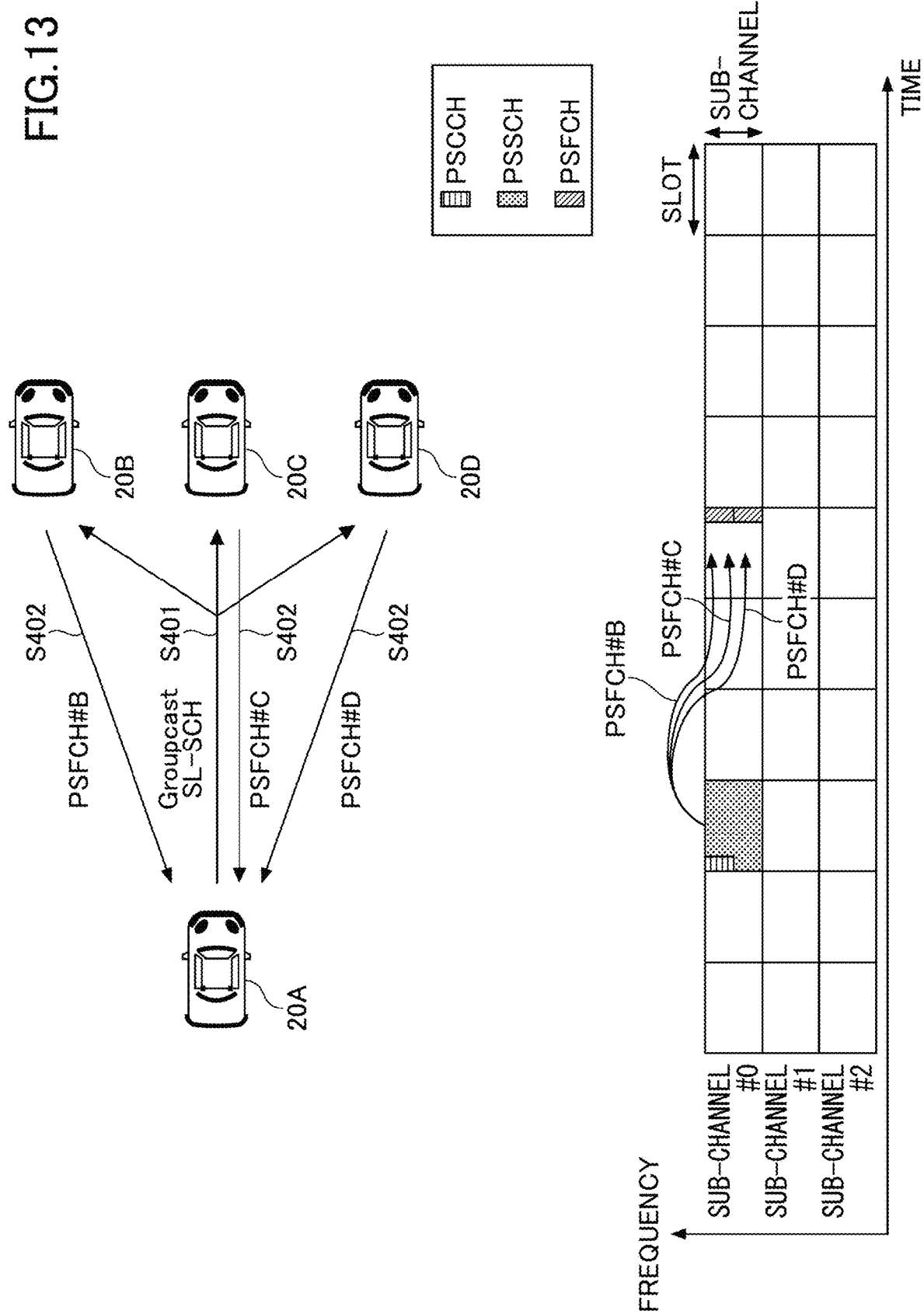
FIG. 13 A sequence diagram illustrating Operation Example (4) of V2X.

FIG. 13 is a sequence diagram illustrating Operation Example (4) of V2X. As described above, in the sidelink of NR, a HARQ response is to be transmitted via PSFCH is supported. Note that, as the format of PSFCH, for example, the same format as a physical uplink control channel (PUCCH) format 0 can be used. That is, the format of PSFCH may be a sequence-based format in which a physical resource block (PRB) size is 1, and ACK and NACK are identified by a difference in a sequence and/or a cyclic shift. The format of PSFCH is not limited thereto. The resource of PSFCH may be arranged in a symbol at the end of the slot or in a plurality of symbols at the end of the slot. In addition, whether or not a period N is configured for the PSFCH resource is defined in advance. The period N may be configured in slot unit, or may be defined in advance.

In FIG. 13, the vertical axis corresponds to the frequency domain, and the horizontal axis corresponds to the time domain. PSCCH may be arranged in one symbol at the head of the slot, may be arranged in a plurality of symbols from the head of the slot, or may be arranged in a plurality of symbols from a symbol that is not at the head of the slot. PSFCH may be arranged in one symbol at the end of the slot, or may be arranged in a plurality of symbols at the end of the slot. In the example illustrated in FIG. 13, three subchannels are configured in the resource pool, and two PSFCHs are arranged in the third slot after a slot in which PSSCH is arranged. An arrow to PSFCH from PSSCH indicates an example of PSFCH that is associated with PSSCH.

In a case where the HARQ response in the groupcast of NR-V2X is a groupcast option 2 for transmitting ACK or NACK, it is necessary to determine a resource that is used in the transmission and reception of PSFCH. As illustrated in FIG. 13, in Step S401, the terminal 20A, which is a transmission side terminal 20, performs groupcast with respect to the terminal 20B, the terminal 20C, and the terminal 20D, which are reception side terminals 20, via SL-SCH. Subsequently, in Step S402, the terminal 20B uses PSFCH#B, the terminal 20C uses PSFCH#C, and the terminal 20D uses PSFCH#D to transmit the HARQ response to the terminal 20A. Here, as illustrated in the example of FIG. 13, in a case where the number of available resources of PSFCH is less than the number of reception side terminals 20 belonging to the group, it is necessary to determine how to allocate the resources of PSFCH. Note that, the transmission side terminal 20 may already have the number of reception side terminals 20 in the groupcast. Note that, in a groupcast option 1, only NACK is transmitted as the HARQ response, and ACK is not transmitted.

Figure 14:
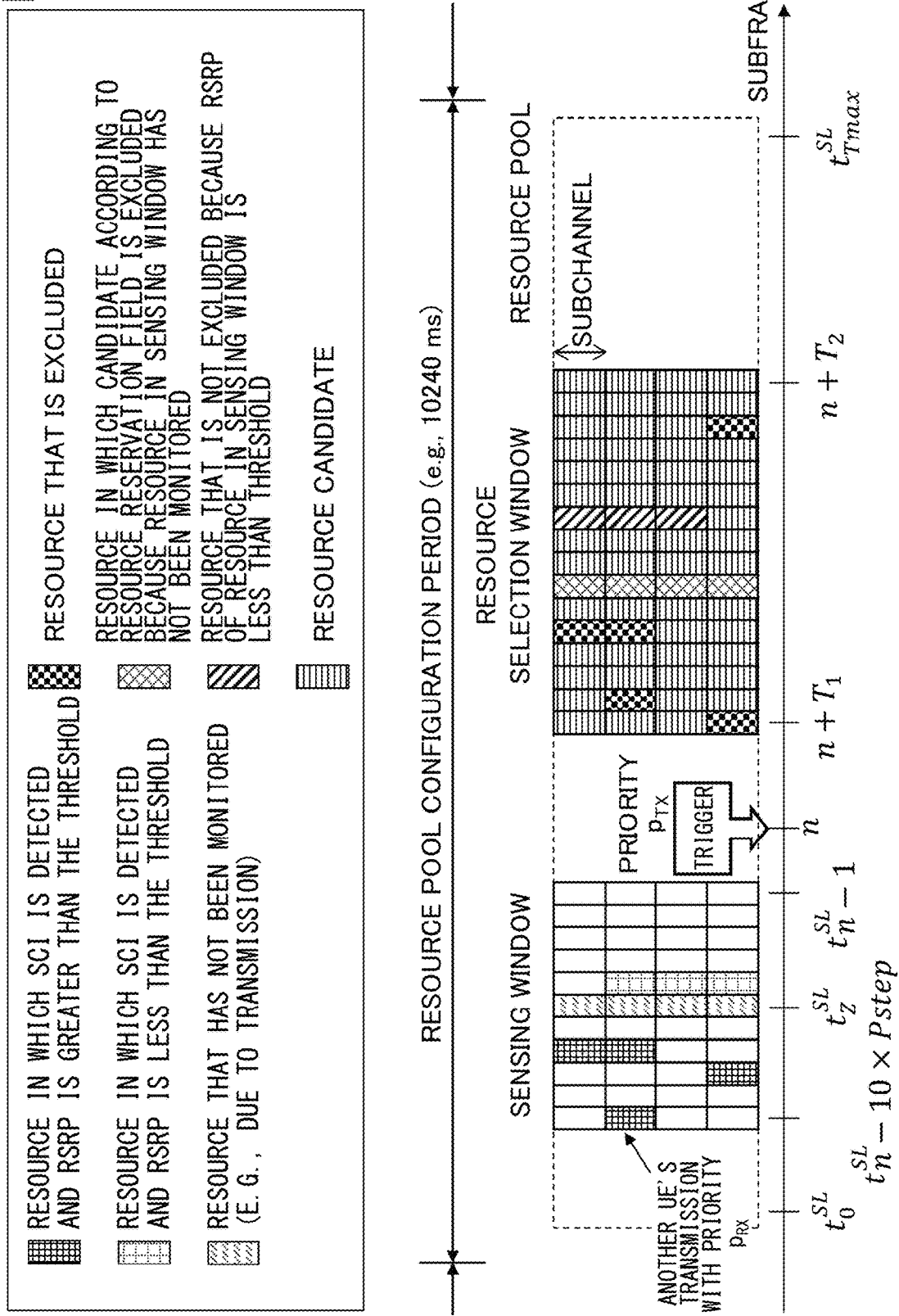
FIG. 14 A diagram illustrating an example of a sensing operation.

FIG. 14 is a diagram illustrating an example of a sensing operation. In a case where partial sensing is not configured by a higher layer in an LTE sidelink, as illustrated in FIG. 14, the terminal 20 performs transmission by selecting a resource. As illustrated in FIG. 14, the terminal 20 executes sensing in a sensing window in the resource pool. By the sensing, the terminal 20 receives a resource reservation field that is included in SCI to be transmitted from another terminal 20, and identifies available resource candidates in the resource selection window in the resource pool, based on the field. Subsequently, the terminal 20 randomly selects a resource from the available resource candidates. Sensing all the resources in the sensing window may be referred to as full sensing.

In addition, as illustrated in FIG. 14, the configuration of the resource pool may have a period. For example, the period may be a period of 10240 milliseconds. FIG. 14 is an example in which subframes from a subframe $t_0^{SL}$ to a subframe $t_{Tmax}^{SL}$ are configured as the resource pool. The domain of the resource pool in the period may be configured by a bitmap, for example.

In addition, as illustrated in FIG. 14, a transmission trigger in the terminal 20 occurs in a subframe n, and the transmission priority is $p_{TX}$. The terminal 20, for example, is capable of detecting that another terminal 20 performs transmission with a priority $p_{RX}$, in the sensing window from a subframe $t_{n-10 \times Pstep}^{SL}$ to a subframe $t_{n-1}^{SL}$. In a case where SCI is detected in the sensing window, and an RSRP is greater than a threshold value, the resource in the resource selection window corresponding to the SCI is excluded. In addition, in a case where SCI is detected in the sensing window, and RSRP is less than the threshold value, the resource in the resource selection window corresponding to the SCI is not excluded. The threshold value, for example, may be a threshold value $Th_{pTX, pRX}$ to be configured or defined for each resource in the sensing window, based on the priority $p_{TX}$ and the priority $p_{RX}$.

In addition, as with a subframe $t_z^{SL}$ illustrated in FIG. 14, a resource in the resource selection window to be a candidate of resource reservation information corresponding to a resource that has not been monitored, for example, due to transmission, in the sensing window, is excluded.

As illustrated in FIG. 14, in the resource selection window from a subframe $n+T_1$ to a subframe $n+T_2$, a resource occupied by another UE is identified, and resources excluding the resource are the available resource candidates. In a case where a set of available resource candidates is denoted as $S_A$, and $S_A$ is less than 20% of the resources in the resource selection window, the threshold value $Th_{pTX, pRX}$ that is configured for each resource in the sensing window may be increased by 3 dB, and the identification of the resource may be executed again. That is, the threshold value $Th_{pTX, pRX}$ is increased, and the identification of the resource is executed again, and thus, the resources that are not excluded because of RSRP being less than the threshold value may be increased. Further, a RSSI of each of the resources of $S_A$ may be measured, and a resource with the minimum RSSI may be added to a set $S_B$. An operation of adding the resource with the minimum RSSI included in $S_A$ to $S_B$ may be repeated until the set of resource candidates $S_B$ becomes greater than or equal to 20% of the resource selection window.

A lower layer of the terminal 20 may report $S_B$ to a higher layer. The higher layer of the terminal 20 may determine a resource to be used, by executing random selection with respect to $S_B$. The terminal 20 may execute sidelink transmission by using the determined resource. Note that, after ensuring the resources, the terminal 20 may periodically use the resources without performing the sensing a predetermined number of times (for example, $C_{resel}$ times).

Figure 15:
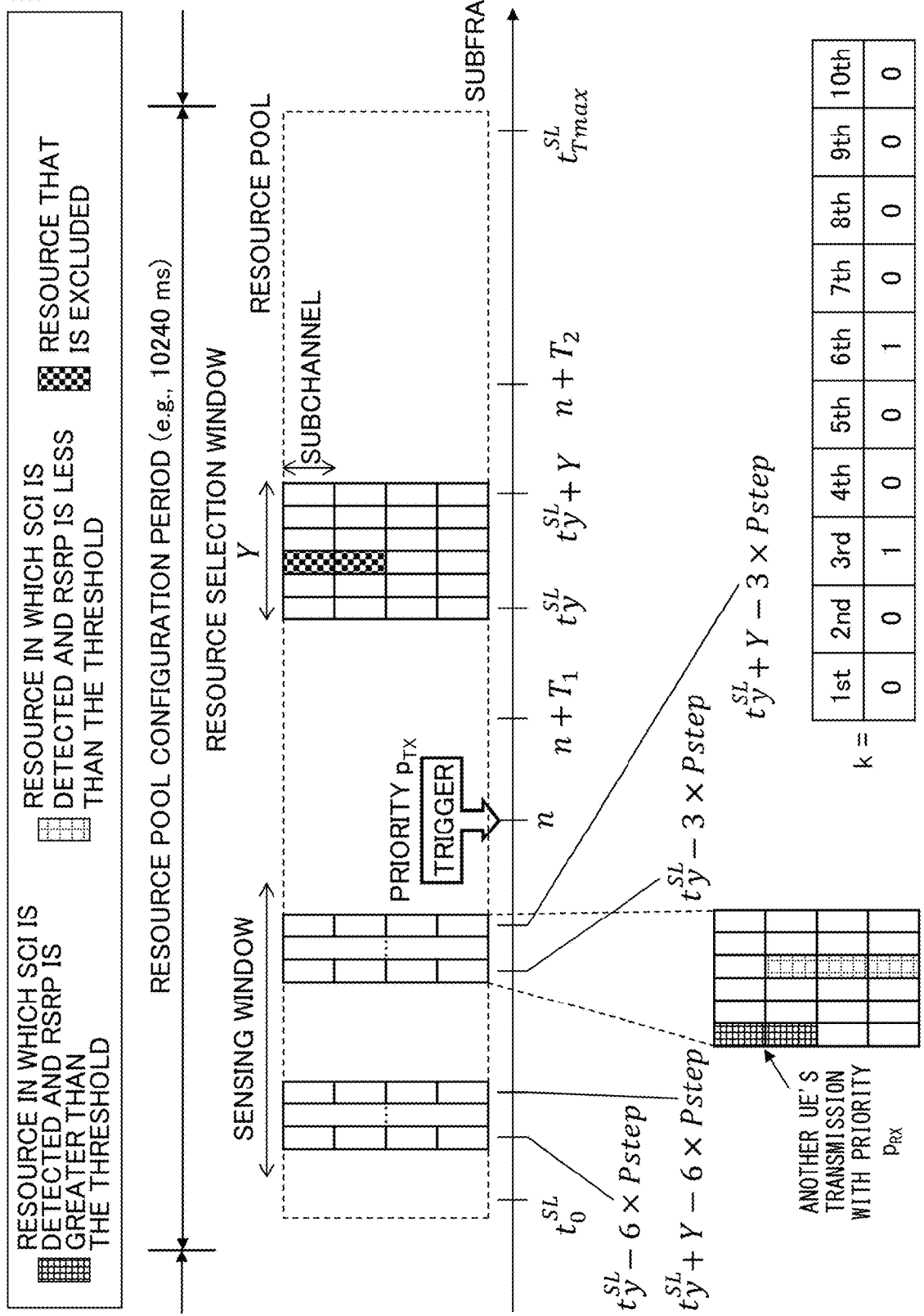
FIG. 15 A diagram illustrating an example of a partial sensing operation.

FIG. 15 is a diagram illustrating an example of a partial sensing operation. In a case where the partial sensing is configured by the higher layer in the LTE sidelink, the terminal 20 performs transmission by selecting a resource as illustrated in FIG. 15. As illustrated in FIG. 15, the terminal 20 executes the partial sensing with respect to a part of the sensing window in the resource pool. According to the partial sensing, the terminal 20 receives a resource reservation field that is included in SCI to be transmitted from another terminal 20, and identifies the available resource candidates in the resource selection window in the resource pool, based on the field. Subsequently, the terminal 20 randomly selects a resource from the available resource candidates.

In addition, as illustrated in FIG. 15, the configuration of the resource pool may have a period. For example, the period may be a period of 10240 milliseconds. FIG. 15 is an example in which subframes from the subframe $t_0^{SL}$ to the subframe $t_{Tmax}^{SL}$ are configured as the resource pool. The domain of the resource pool in the period may be configured by a bitmap, for example.

As shown in FIG. 15, it is assumed that a transmission trigger in the terminal 20 is generated in the subframe n and the priority of the transmission is $p_{TX}$. As shown in FIG. 15, among the subframes n+T$_1$ to n+T$_2$, Y subframes from the subframe $t_y^{SL}$ to the subframe $t_{y+Y}^{SL}$ may be configured as a resource selection window. In addition, as shown in FIG. 15, it is assumed that a transmission trigger in the terminal 20 is generated in the subframe n and the priority of the transmission is $p_{TX}$.

The terminal 20 can detect, for example, that another terminal 20 is performing transmission with the priority $p_{RX}$ in one or more sensing windows having a Y subframe length from the subframe $t_{y-k\times Pstep}^{SL}$ to the subframe $t_{y+Y-k\times Pstep}^{SL}$. k may be, for example, a 10-bit bitmap. FIG. 15 shows an example in which the third and sixth bits of the bitmap k are configured to "1" indicating that partial sensing is to be performed. That is, in FIG. 15, subframes from $t_{y-6\times Pstep}^{SL}$ to $t_{y+Y-6\times Pstep}^{SL}$ and subframes from $t_{y-3\times Pstep}^{SL}$ to $t_{y+Y-3\times Pstep}^{SL}$ are configured as a sensing window. As described above, the i-th bit of the bitmap k may correspond to a sensing window from the subframe $t_{y-i\times Pstep}^{SL}$ to the subframe $t_{y+Y-i\times Pstep}^{SL}$.

In a case where the SCI is detected in the one or more sensing windows and the RSRP exceeds the threshold value, the resources in the resource selection window corresponding to the SCI are excluded. In addition, in a case where the SCI is detected in the sensing window and the RSRP is less than the threshold value, the resources in the resource selection window corresponding to the SCI are not excluded. The threshold value may be, for example, a threshold value Th$_{pTX, pRX}$ configured or defined for each resource in the sensing window based on the priority $p_{TX}$ and the priority pax.

In the resource selection window in which the Y subframes are configured, the terminal 20 identifies resources occupied by another UE, and resources excluding the resources become available resource candidates. Assuming that the set of available resource candidates is $S_A$, in a case where $S_A$ is less than 20% of the resources in the resource selection window, the threshold value Th$_{pTX, pRX}$ configured for each resource in the sensing window may be increased by 3 dB and resource identification may be performed again. That is, by increasing the threshold value Th$_{pTX, pRX}$ and performing the resource identification again, resources that are not excluded because the RSRP is less than the threshold value may be increased. In addition, the RSSI of each resource of $S_A$ may be measured, and a resource having a smallest RSSI may be added to a set $S_B$. The operation of adding a resource having a smallest RSSI included in $S_A$ to $S_B$ may be repeated until the set $S_B$ of the resource candidates becomes 20% or more of the resource selection window.

The lower layer of the terminal 20 may report $S_B$ to the upper layer. The upper layer of the terminal 20 performs random selection with respect to $S_B$ to determine the resources to be used. The terminal 20 may perform sidelink transmission by using the determined resources. Note that, once the resources are secured, thereafter, the terminal 20 may use the resources periodically without performing sensing a predetermined number of times (for example, $C_{resel}$ times).

Although the operation of the transmitting side terminal 20 has been described with reference to FIGS. 14 and 15 described above, the receiving side terminal 20 may detect data transmission from another terminal 20 based on the result of sensing or partial sensing and may receive the data from the another terminal 20.

In a NR release 17 sidelink, power saving based on the random resource selection and the partial sensing described above has been discussed. For example, for the sake of power saving, a method based on the random resource selection and the partial sensing of a sidelink in LTE release 14 may be applied to a resource allocation mode 2 of a NR release 16 sidelink. The terminal 20 to which the partial sensing is applied executes the reception and the sensing only in a specific slot in the sensing window.

In addition, in the NR release 17 sidelink, enhanced Ultra Reliable Low Latency Communication (eURLLC) is being discussed by using terminal-to-terminal coordination (inter-UE coordination) as a base line. For example, the terminal 20A may share information indicating a resource set with the terminal 20B, and the terminal 20B may consider the information in the resource selection for transmission.

It has been considered that the communication quality can be improved by transmitting various information items from the terminal 20A to the terminal 20B and by operating, by the terminal 20B, based on the information. That is, it has been considered that sharing between terminals not only the resource set but also other information items is to be effective. However, it has been unclear what information should be shared between the terminals 20. Further, it has been unclear how the information should be shared between the terminals 20. Furthermore, it has been unclear how the information shared between the terminals 20 should be used.

Figure 16:
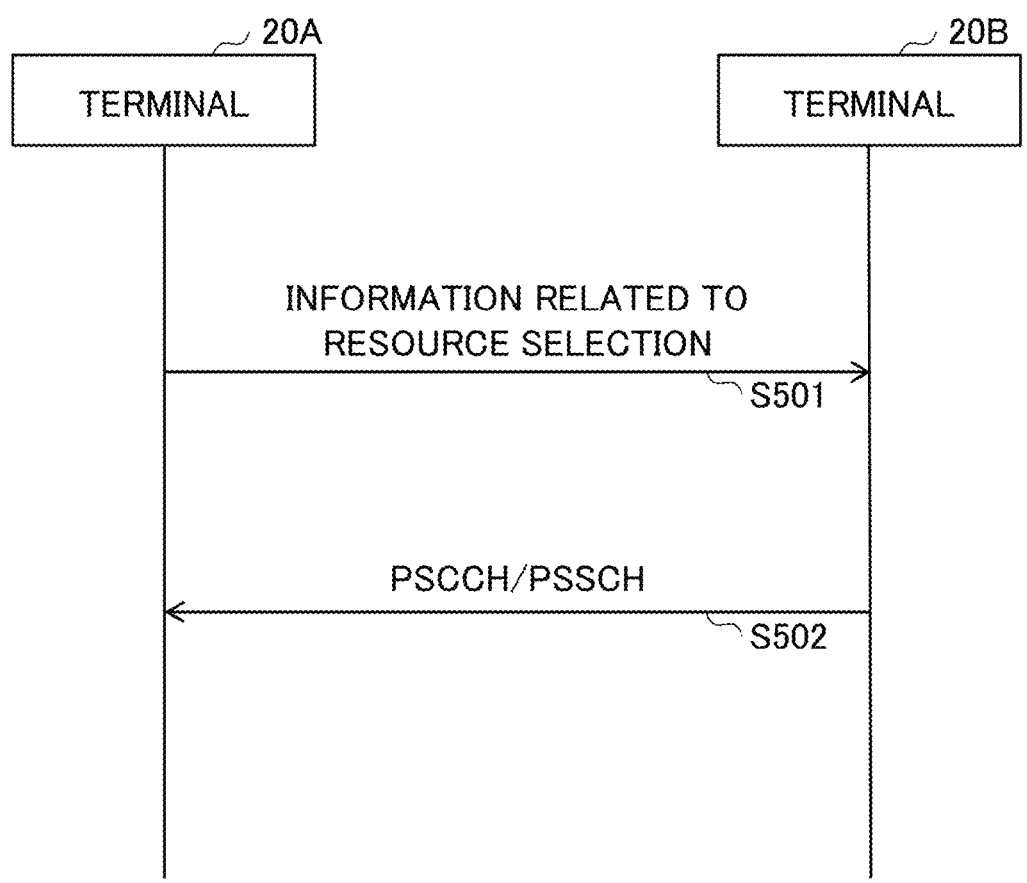
FIG. 16 A sequence diagram illustrating an example of terminal-to-terminal coordination according to an embodiment of the present invention.

Therefore, the terminal 20A may transmit information related to resource selection to the terminal 20B via the resource relating to the feedback channel. FIG. 16 is a sequence diagram illustrating an example of terminal-to-terminal coordination according to an embodiment of the present invention. In step S501, the terminal 20A transmits information relating to resource selection to the terminal 20B via the resource relating to the feedback channel. Subsequently in step S502, the terminal 20B may select a resource based on the information relating to the received resource selection and transmit, for example, PSCCH/PSSCH to the terminal 20A. PSSCH may also be referred to as data.

The above-described "information relating to resource selection" may be at least one of the following information items A) to D).

A) A sensing result. e.g., RSRP (Reference Signal Received Power), RSSI (Received Signal Strength Indicator).

B) A resource determined based on sensing. For example, a resource to be used or not to be used.

C) Indication of re-evaluation or re-selection. From among the resources that have been reserved, a resource to be used or not to be used, may be indicated. The terminal 20B may perform re-evaluation or re-selection by excluding at least some of the resources that have been reserved (e.g., the resources indicated by B).

D) A sidelink grant. The terminal 20B may use a resource indicated by the received sidelink grant.

As described above, the information relating to resource selection is indicated, and the terminal 20B performs the operation of resource selection based on the information shared by the terminal 20A, thereby reducing the probability of resource collision. Further, with the above-described A), the terminal 20B can become aware of the accurate amount of interference. Further, according to the above-described B), the terminal 20B can become aware of the desired resources to be used. Further, according to C), it is possible to execute terminal-to-terminal coordination operation with a relatively small amount of information. Further, according to the above-described D), because the terminal 20 having the sidelink resource scheduling function executes the above-described D), a cooperative effect is highly expected.

The "resource relating to the feedback channel" can be any of 1) and 2) illustrated below.

1) a Resource Available for PSFCH

For example, the time resource may be the X-th symbol from the last symbol (e.g., the second symbol) in each slot of the parameter sl-PSFCH-Period indicating the period of PSFCH. For example, the frequency resource may be a PRB determined based on the parameter sl-PSFCH-RB-Set indicating the frequency domain of PSFCH. The code resource may also be a pair of cyclic shifts determined based on the parameter sl-NumMuxCS-Pair relating to the cyclic shift of PSFCH.

2) a Resource that is Frequency Division Multiplexed with, and/or Code Division Multiplexed with, the Resource Available for PSFCH.

Figure 17:
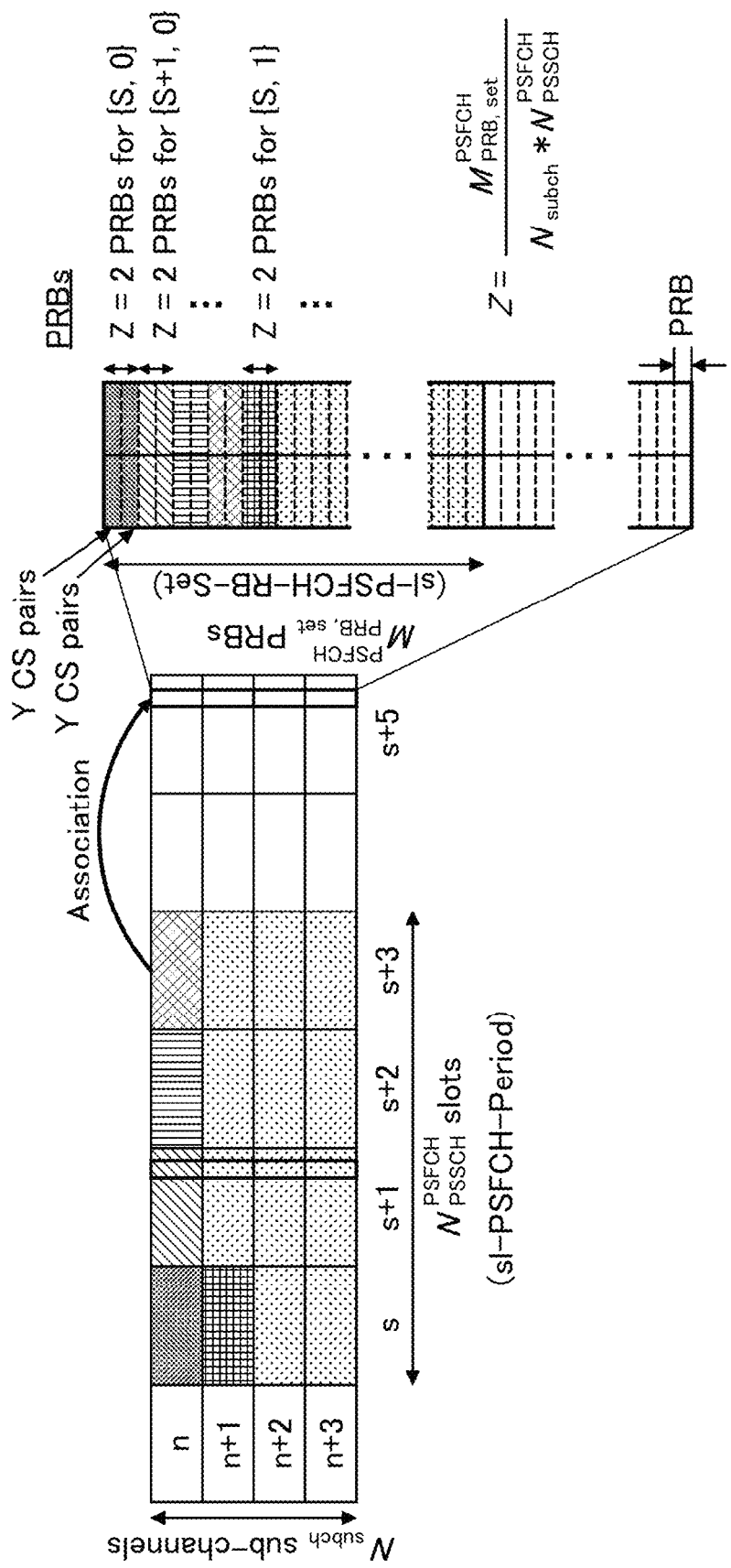
FIG. 17 A diagram illustrating an example (1) of resources used for terminal-to-terminal coordination according to an embodiment of the present invention.

FIG. 17 is a diagram illustrating an example (1) of a resource used for terminal-to-terminal coordination according to an embodiment of the present invention. For example, the resource may be at least a portion of a PRB other than the PRB specified in sl-PSFCH-RB-Set in a resource pool. That is, in FIG. 17, the PRB that is frequency division multiplexed with the resource in which the PSFCH associated with the PSSCH is located, may be used as resources relating to the feedback channel. The PRB specified in the sl-PSFCH-RB-Set in a resource pool may also be used as resources relating to the feedback channel. FIG. 18 is a diagram illustrating an example (2) of resources used for terminal-to-terminal coordination according to an embodiment of the present invention. For example, a cyclic shift pair determined based on the sl-NumMuxCS-Pair defined as in FIG. 18 may be used as resources relating to the feedback channel, or all cyclic shift pairs may be used as resources relating to the feedback channel, or cyclic shift pairs determined based on certain parameters may be used as resources relating to the feedback channel.

A method of determining the above-described frequency resources may be combined with a method of determining the above-described code resources to determine the resources relating to the feedback channel. At least some of the cyclic shift pairs other than the cyclic shift pairs determined based on sl-NumMuxCS-Pair may be used as resources relating to the feedback channel resource. In the example illustrated in FIG. 18, the cyclic shifts (1, 2, 4, 5, 7, 8, 10, 11) not used for HARQ-ACK may be used as resources relating to the feedback channel in a case where Y=2, i.e., the cyclic shifts are 0 and 3 for NACK, and are 6 and 9 for ACK.

By determining the resources relating to the feedback channel as described in 1) and 2) above, the sidelink resources that have been conventionally unused can be effectively used. In addition, according to 1) above, PSFCH of a timing that is not used at the PSFCH occasion, can be used. In addition, according to the above 2), resources that are not used due to the configuration in the resource pool can be used.

Here, "information relating to resource selection" may be transmitted in "a resource relating to the feedback channel" by any method of a), b) or c) illustrated below.

a) "Information relating to resource selection" may be transmitted at the HARQ feedback. For example, it is assumed that the terminal 20A receives a transport block from the terminal 20B but fails in decoding. At this time, the SCI relating to the transport block reserves a resource for retransmission. In a case where the reserved resource may be used for retransmission, the terminal 20A transmits only the NACK to the terminal 20B. In a case where, on the other hand, a resource different from the reserved resource should be used for retransmission, the terminal 20A may transmit NACK and/or the "information relating to resource selection". For example, as the "information relating to resource selection", a resource that should be used or that should not be used, may be transmitted.

In a case where the terminal 20A transmits NACK and/or the "information relating to resource selection", the terminal 20A may use a resource that is frequency division multiplexed with or code division multiplexed with, the PSFCH resource used for transmitting only NACK.

Figure 19:
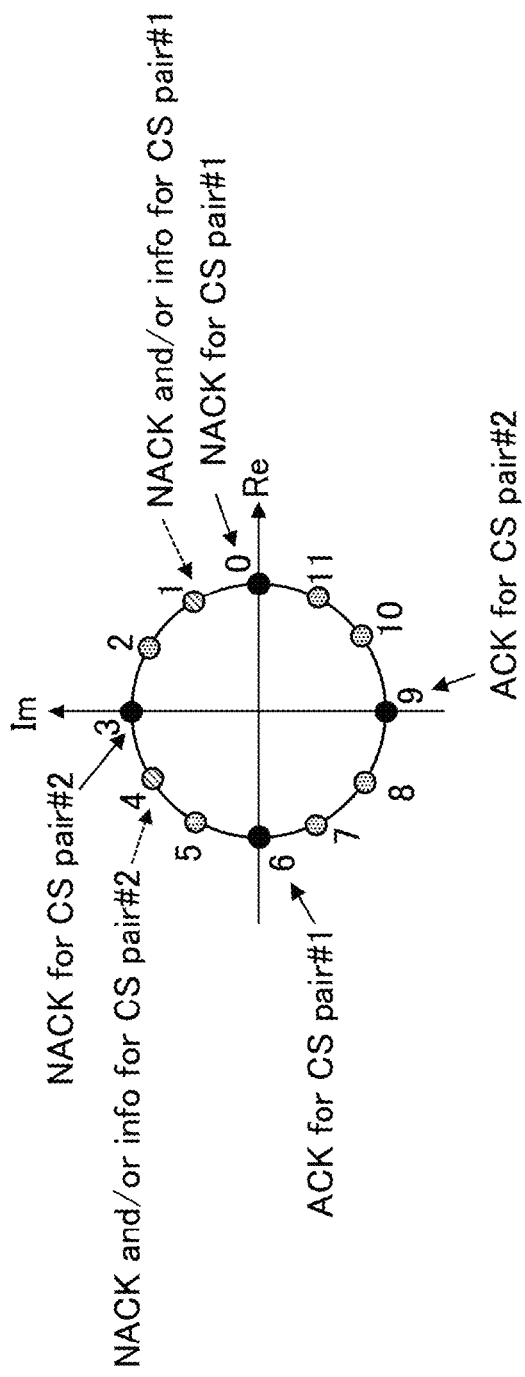
FIG. 19 A drawing illustrating an example (3) of resources used for terminal-to-terminal coordination according to an embodiment of the present invention.

FIG. 19 is a diagram illustrating an example (3) of a resource used for terminal-to-terminal coordination according to an embodiment of the present invention. FIG. 19 illustrates a case in which at least some of the cyclic shifts to be code division multiplexed, other than the cyclic shift pairs determined based on sl-NumMuxCS-Pair, are to be used as resources relating to the feedback channel. As illustrated in FIG. 19, the cyclic shift indices 1 and 4 adjacent to indexes 0 and 3 of the cyclic shift used for the NACK-only PSFCH resources may be used to transmit NACK and/or information relating to resource selection, from among the cyclic shift indices not used for the ACK or NACK.

Figure 20:
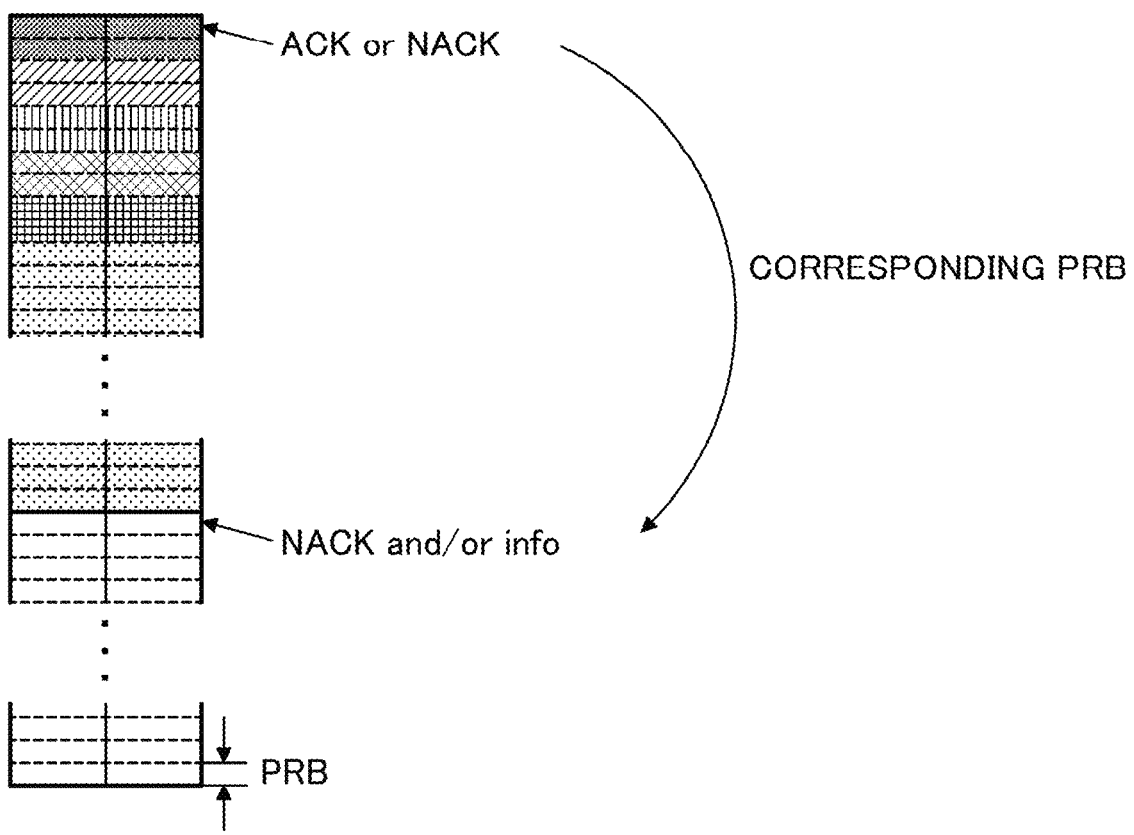
FIG. 20 A drawing illustrating an example (4) of resources used for terminal-to-terminal coordination according to an embodiment of the present invention.

FIG. 20 is a diagram illustrating an example (4) of a resource used for terminal-to-terminal coordination according to an embodiment of the present invention. As illustrated in FIG. 20, as a PRB corresponding to a resource used for PSFCH for transmitting ACK or NACK, a PRB, which is frequency division multiplexed, and to which PSFCH is not mapped, may be used as a resource for transmitting NACK and/or information relating to resource selection.

By transmitting information relating to resource selection in the resource relating to the feedback channel as described above, the retransmission quality can be improved and the additional operation of the terminal 20 can be reduced.

b) The terminal 20A transmitting the "information relating to resource selection" may determine when it is to be transmitted and/or which resource is to be used for transmission. The channel placed in the determined resource may be referred to as PSXCH. The PSXCH may be at least one of PSCCH, PSSCH, PSFCH, PSBCH and a new channel. In a case where PSXCH is a new channel, for example, data and DM-RS may be frequency division multiplexed, may be mapped to multiple PRBs, or may be encoded by Polar coding.

Figure 21:
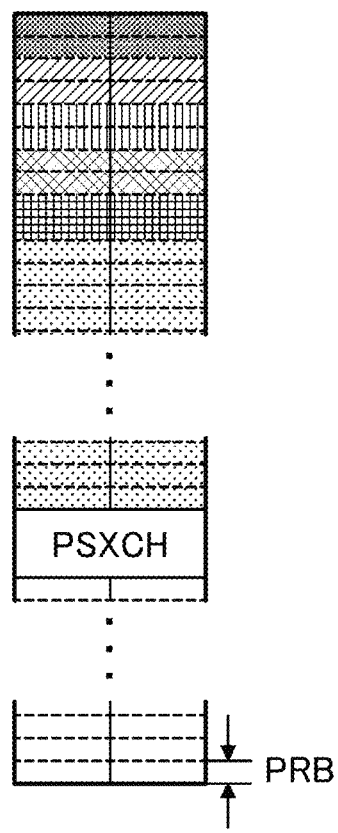
FIG. 21 A drawing illustrating an example (5) of resources used for terminal-to-terminal coordination according to an embodiment of the present invention.

FIG. 21 is a diagram illustrating an example (5) of a resource used for terminal-to-terminal coordination according to an embodiment of the present invention. For example, PSXCH may be arranged by being frequency division multiplexed with PSFCH as illustrated in FIG. 21.

In addition, information relating to a future resource reservation may be transmitted by a resource that is determined, with respect to when transmission is to be performed and/or which resource is to be transmitted, by the terminal 20A that transmits "information relating to resource selection". For example, information indicating which PSFCH occasion is to be used may be transmitted or information indicating which frequency resource is to be used may be transmitted.

In addition, in a case where the resource, which is determined, with respect to when transmission is to be performed and/or which resource is to be transmitted, by the terminal 20A that transmits "information relating to resource selection", overlaps with PSFCH transmission and/or reception for HARQ feedback, for example: the PSFCH transmission and/or reception for HARQ feedback may be prioritized; or transmission of information relating to resource selection may be performed at the same time as the PSFCH transmission and/or reception; or a rule may be defined to arbitrate simultaneous transmissions, and simultaneous transmission may be performed only in a case where a condition for simultaneous transmissions is met, and, in a case where the condition for simultaneous transmissions is not met, a transmission with lower priority may be dropped.

The terminal 20A may constantly monitor the resource, which is determined, with respect to when transmission is to be performed and/or which resource is to be transmitted, by the terminal 20A that transmits "information relating to resource selection", that is, the resource relating to the feedback channel. By constantly monitoring, the terminal 20A can transmit "information relating to resource selection" at any time.

c) The terminal 20A transmitting "information relating to resource selection" may be requested by another terminal 20 to indicate when transmission is to be performed and/or which resource is to be transmitted. The channel to be placed in the requested resource may be referred to as PSXCH. The PSXCH may be at least one of PSCCH, PSSCH, PSFCH, PSBCH and a new channel. In a case where PSXCH is a new channel, for example, data and DM-RS may be frequency division multiplexed, may be mapped to multiple PRBs, or may be encoded by Polar coding. For example, PSXCH may be arranged by being frequency division multiplexed with PSFCH as illustrated in FIG. 21.

Further, information relating to future resource reservation may be transmitted by the resource for which the terminal 20A transmitting "information relating to resource selection" is requested by another terminal to indicate when transmission is to be performed and which resource is to be transmitted. For example, information indicating which PSFCH occasion is to be used may be transmitted or information indicating which frequency resource is to be used may be transmitted.

Also, in a case where the resource, for which the terminal 20A transmitting "information relating to resource selection" is requested by another terminal to indicate when transmission is to be performed and which resource is to be transmitted, overlaps with PSFCH transmission and/or reception for HARQ feedback, for example, the PSFCH transmission and/or reception for HARQ feedback may be prioritized, or transmission of information relating to resource selection may be performed at the same time as the PSFCH transmission and/or reception, or a rule may be defined to arbitrate simultaneous transmissions, and simultaneous transmission may be performed only in a case where a condition for simultaneous transmissions is met, and, in a case where the condition for simultaneous transmissions is not met, a transmission with lower priority may be dropped.

Note that the terminal 20 that performs partial sensing may be a terminal 20 that performs a sensing method different from the full sensing that is specified in the release 16, may be a terminal 20 that does not perform sensing, or may be a terminal 20 that performs reception only in a limited time (e.g., a DRX).

Note that the full sensing may mean sensing all resources in the sensing window. The sensing window may be specified by a slot section period $[n-T_0, n-T_{proc, 0}]$ and n may be a slot corresponding to the packet arrival timing.

The above described embodiments are not limited to V2X terminals, but may be applied to terminals that perform D2D communication.

Note that the terminal 20 may also be aware of a timing when the reception of another terminal 20 can be performed and/or a timing when the transmission of another terminal 20 can be performed. The terminal 20 may become aware of the timing by determining the timing with technical specifications or pre-configuration, or with the indication of the timing from another terminal 20.

Note that, in the examples described above, the timing, that is, the time resource may be substituted with the frequency resource.

The sharing of information between terminals in the embodiments described above may be performed by any of broadcast, groupcast, or unicast. The sharing of information between terminals in the embodiments described above may be performed only between terminals in which an RRC connection is established between terminals. The operation of terminal 20 in the above described embodiment may also be performed only in a particular resource pool. For example, the operation of the terminal 20 in the above-described embodiment may only be performed in a resource pool that can be used by the terminal 20 of release 17 or onwards.

The information shared between terminals in the above-described embodiment may be at least one of the information illustrated in 1)-8) below.

1) A sensing result
2) A resource determined based on sensing
3) Indication of re-evaluation or re-selection
4) A sidelink grant
5) Information relating to a synchronization source
6) Information relating to PSFCH occasions to be transmitted and received
7) Information relating to transmission power reduction due to in-device coexistence
8) Information relating to a resource that is reserved, but is not to be used According to the embodiment described above, the terminal 20 can efficiently receive information relating to a resource from another terminal 20 via the feedback channel resource and can use the appropriate resource at the time of transmission, based on the information.

That is, in the direct communication between terminals, coordination operation between terminals can be performed to improve the efficiency of the communication.

(Device Configuration)

Next, a functional configuration example of the base station 10 and the terminal 20 for performing the processes and operations described above will be described. The base station 10 and terminal 20 include functions for implementing the embodiments described above. However, each of the base stations 10 and the terminal 20 may include only some of the functions in the embodiment.

<Base Station 10>

Figure 22:
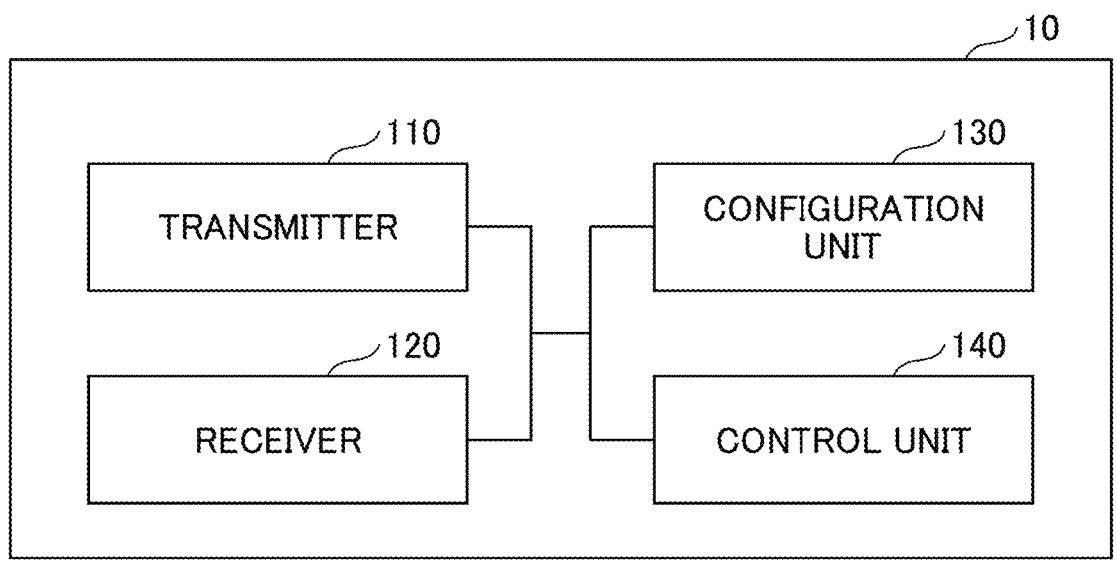
FIG. 22 A drawing illustrating an example of a functional configuration of a base station 10 according to an embodiment of the present invention.

FIG. 22 is a diagram illustrating an example of a functional configuration of the base station 10. As illustrated in FIG. 22, the base station 10 includes a transmitter 110, a receiver 120, a configuration unit 130, and a control unit 140. The functional configuration illustrated in FIG. 22 is only one example. If the operation according to the embodiments of the present invention can be performed, the functional category and the name of the functional unit may be anything.

The transmitter 110 includes a function for generating a signal to be transmitted to the terminal 20 side and transmitting the signal wirelessly. The receiver 120 includes a function for receiving various signals transmitted from the terminal 20 and acquiring, for example, information of a higher layer from the received signals. The transmitter 110 has a function to transmit NR-PSS, NR-SSS, NR-PBCH, DL/UL control signals, DL reference signals, and the like to the terminal 20.

The configuration unit 130 stores preset setting information and various setting information to be transmitted to the terminal 20 in the storage device and reads the preset setting information from the storage device if necessary. The contents of the setting information are, for example, information relating to the setting of D2D communication.

As described in the exemplary embodiment, the control unit 140 performs processing pertaining to the setting in which the terminal 20 performs the D2D communication. The control unit 140 transmits scheduling of D2D communication and DL communication to the terminal 20 through the transmitter 110. The control unit 140 receives information relating to the HARQ response of the D2D communication and the DL communication from the terminal 20 via the receiver 120. A function unit relating to signal transmission in the control unit 140 may be included in the transmitter 110, and a function unit relating to signal reception in the control unit 140 may be included in the receiver 120.

<Terminal 20>

Figure 23:
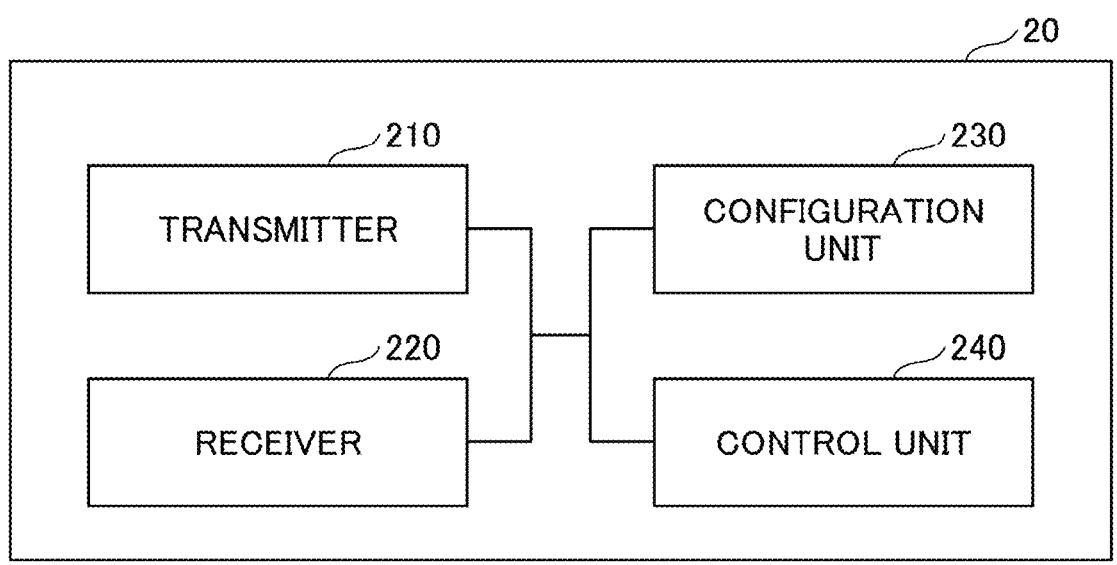
FIG. 23 A drawing illustrating an example of a functional configuration of a terminal 20 according to an embodiment of the present invention.

FIG. 23 is a diagram illustrating an example of a functional configuration of the terminal 20. As illustrated in FIG. 23, the terminal 20 includes a transmitter 210, a receiver 220, a configuration unit 230, and a control unit 240. The functional configuration illustrated in FIG. 23 is only one example. If the operation according to the embodiments of the present invention can be performed, the functional category and the name of the functional unit may be anything.

The transmitter 210 creates a transmission signal from the transmission data and wirelessly transmits the transmission signal. The receiver 220 receives various signals wirelessly and acquires signals from higher layers from the received signal of the physical layer. The receiver 220 has a function to receive NR-PSS, NR-SSS, NR-PBCH, DL/UL/SL control signals or reference signals transmitted from the base station 10. For example, the transmitter 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), and the like to the other terminal 20 as D2D communication, and the receiver 220 receives PSCCH, PSSCH, PSDCH, PSBCH, and the like from the other terminal 20.

The configuration unit 230 stores various setting information received from the base station 10 or the terminal 20 by the receiver 220 in the storage device and reads it from the storage device as necessary. The configuration unit 230 also stores the preset setting information. The contents of the setting information are, for example, information relating to the setting of D2D communication.

The control unit 240 controls D2D communication to establish an RRC connection with the other terminal 20, as described in the embodiment. The control unit 240 performs processing pertaining to the power saving operation. The control unit 240 performs processing relating to HARQ of D2D communication and DL communication. The control unit 240 transmits information relating to the HARQ response of the D2D communication and the DL communication to the other terminal 20 scheduled from the base station 10. The control unit 240 may schedule D2D communication to the other terminal 20. The control unit 240 may select resources used for D2D communication autonomously from the resource selection window based on the sensing result, or may perform reevaluation or preemption. The control unit 240 performs processing relating to power saving when transmitting and receiving D2D communication. A function unit relating to signal transmission in the control unit 240 may be included in the transmitter 210, and a function unit relating to signal reception in the control unit 240 may be included in the receiver 220.

(Hardware Configuration)

Block diagrams (FIGS. 22 and 23) used in the description of the above embodiments show blocks of functional units. These functional blocks (components) are implemented by any combination of hardware and/or software. In addition, the implementation method of each function block is not particularly limited. That is, each functional block may be implemented using a single device that is physically or logically combined, or two or more devices that are physically or logically separated may be directly or indirectly connected (e.g., using wired, wireless, etc.) and implemented using these multiple devices. The functional block may be implemented by combining software with the device or devices.

Functions include, but are not limited to, judgment, determination, determination, calculation, calculation, processing, derivation, research, search, verification, reception, transmission, output, access, resolution, selection, selection, establishment, comparison, assumption, expectation, and deeming; broadcasting, notifying, communicating, forwarding, configuring, reconfiguring, allocating, mapping, and assigning. For example, a functional block (component) that functions to transmit is called a transmitting unit or transmitter. In either case, as described above, the realization method is not particularly limited.

Figure 24:
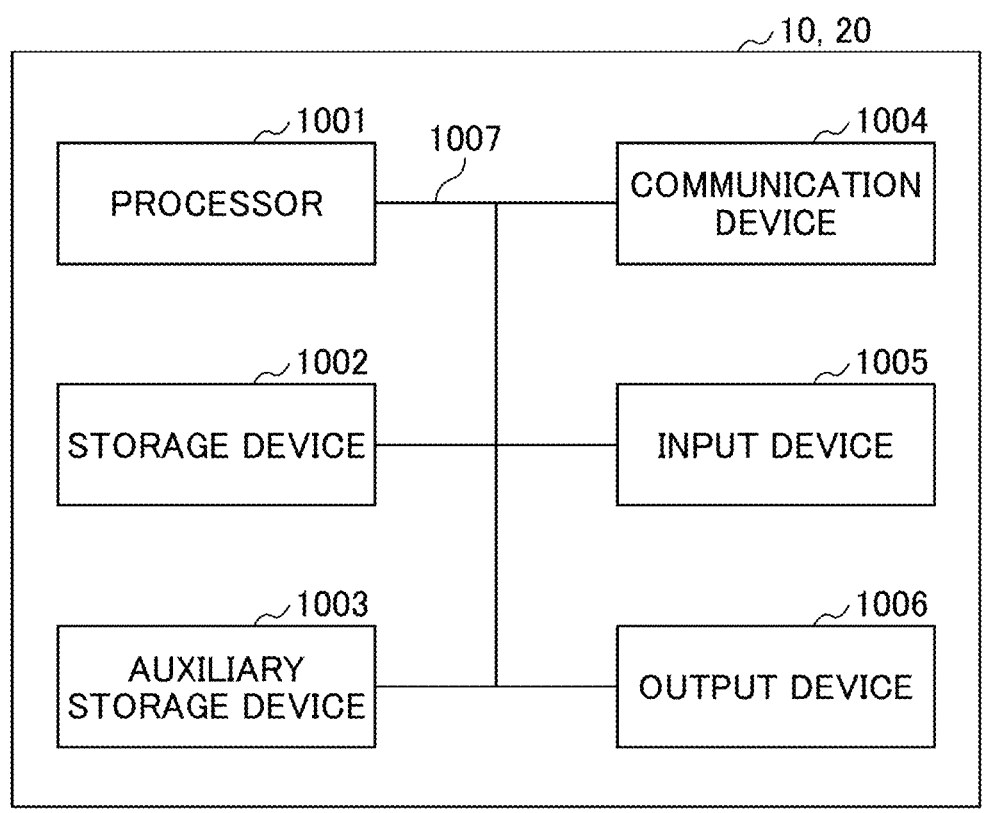
FIG. 24 A drawing illustrating an example of a hardware configuration of the base station 10 or the terminal 20 according to an embodiment of the present invention.

For example, the base station 10, the terminal 20, etc., according to an embodiment of the present disclosure may function as a computer for processing the radio communication method of the present disclosure. FIG. 24 is a diagram illustrating an example of the hardware configuration of the base station 10 and the terminal 20 according to an embodiment of the present disclosure. The base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "apparatus" can be read as circuits, devices, units, etc. The hardware configuration of the base station 10 and terminal 20 may be configured to include one or more of the devices illustrated in the figure or may be configured without some of the devices.

The functions in the base station 10 and the terminal 20 are realized by performing operations by the processor 1001 by reading predetermined software (programs) on hardware such as the processor 1001 and the storage device 1002, and controlling communication by the communication device 1004 and controlling at least one of reading and writing of data in the storage device 1002 and the auxiliary storage device 1003.

A processor 1001 operates, for example, an operating system to control the entire computer. The processor 1001 may be comprised of a central processing unit (CPU) including an interface with peripheral devices, a controller, an arithmetic unit, a register, and the like. For example, the above-described control unit 140, control unit 240, and the like may be implemented by the processor 1001.

The processor 1001 reads out a program (program code), software module, data, or the like from at least one of the auxiliary storage device 1003 and the communication device 1004 to the storage device 1002 and performs various processing in accordance with the above. As a program, a program that causes a computer to execute at least a part of the operation described in the above-described embodiment is used. For example, the control unit 140 of the base station 10 illustrated in FIG. 22 may be stored in the storage device 1002 and implemented by a control program operating in the processor 1001. For example, the control unit 240 of the terminal 20 illustrated in FIG. 23 may be stored in the storage device 1002 and implemented by a control program operating in the processor 1001. Although the foregoing processes have been described and executed by one processor 1001, they may be executed simultaneously or sequentially by two or more processors 1001. Processor 1001 may be implemented by one or more chips. The program may be transmitted from the network via a telecommunication line.

The storage device 1002 is a computer-readable recording medium and may be comprised of at least one of, for example, ROM (Read Only Memory), EPROM (Erasable Programmable ROM), EEPROM (Electrically Erasable Programmable ROM), RAM (Random Access Memory), and the like. The storage device 1002 may be referred to as a register, cache, main memory (main memory), or the like. The storage device 1002 can store programs (program codes), software modules, etc., executable to implement a communication method according to an embodiment of the present disclosure.

The auxiliary storage device 1003 is a computer-readable recording medium and may comprise at least one of an optical disk, such as a CD-ROM (Compact Disc ROM), a hard disk drive, a flexible disk, a magneto-optical disk (e.g., a compact disk, a digital versatile disk, a Blu-ray disk), a smart card, a flash memory (e.g., a card, a stick, a key drive), a floppy disk, a magnetic strip, and the like. The storage medium described above may be, for example, a database, a server, or other suitable medium that includes at least one of a storage device 1002 and an auxiliary storage device 1003.

The communication device 1004 is a hardware (transmitting/receiving device) for performing communication between computers via at least one of a wired network and a wireless network, and is also referred to as a network device, a network controller, a network card, a communication module, or the like. The communication device 1004 may comprise, for example, a high frequency switch, a duplexer, a filter, a frequency synthesizer, or the like to implement at least one of a frequency division duplex (FDD) and a time division duplex (TDD). For example, the transmitting/receiving antenna, the amplifier unit, the transmitter/receiver, the transmission line interface, and the like may be implemented by the communication device 1004. Transmitters and receivers may be physically or logically isolated implementations of the transmitters and receivers.

The input device 1005 is an input device (e.g., a keyboard, mouse, microphone, switch, button, sensor, etc.) that accepts external input. Output device 1006 is an output device (e.g., a display, speaker, LED lamp, etc.) that implements an external output. The input device 1005 and the output device 1006 may have an integral configuration (for example, a touch panel).

Each device, such as a processor 1001 and a storage device 1002, is connected by a bus 1007 for communicating information. Bus 1007 may be constructed using a single bus or may be constructed using different buses between devices.

The base station 10 and terminal 20 may also include hardware such as a microprocessor, a digital signal processor (DSP), an ASIC (Application Specific Integrated Circuit), a PLD (Programmable Logic Device), an FPGA (Field Programmable Gate Array), and some or all of the functional blocks may be realized by the hardware. For example, processor 1001 may be implemented using at least one of these hardware.

Summary of Embodiments

As described above, according to an embodiment of the present invention, a terminal is provided. The terminal includes:
a transmitter configured to transmit information relating to resource selection to another terminal via a resource relating to a HARQ (Hybrid automatic repeat request) feedback channel; and
a receiver configured to receive data from the another terminal via a resource determined based on the information relating to the resource selection, wherein
the information relating to the resource selection includes at least one of a sensing result, information indicating a resource determined based on sensing, an indication of re-evaluation or re-selection, or a sidelink grant.

With the above configuration, the terminal 20 can efficiently receive information relating to a resource from another terminal 20 via the feedback channel resource and can use an appropriate resource at the time of transmission, based on the information. That is, in the direct communication between terminals, coordination operation between terminals can be performed to improve the efficiency of the communication.

The resource relating to the HARQ feedback channel may be a resource that can be used for the feedback channel. The configuration enables the terminal 20 to efficiently transmit information relating to the resource from the another terminal 20 via the feedback channel resource.

The resources relating to the HARQ feedback channel may be a resource that is to be frequency division multiplexed with, or that is code division multiplexed with, a resource that can be used for the feedback channel. The configuration enables the terminal 20 to efficiently transmit information relating to the resource from another terminal 20 via the feedback channel resource.

Upon transmitting a HARQ feedback of a negative response, the transmitter may include information specifying a resource for retransmission in the information relating to the resource selection to be transmitted to the another terminal. The configuration enables the terminal 20 to efficiently transmit the resource information from the another terminal 20 via the feedback channel resource and allow the appropriate resource to be used at the time of retransmission.

The transmitter may transmit information relating to the resource selection to the another terminal using a resource that is to be frequency division multiplexed with, or, that is to be code division multiplexed with, a resource used for transmitting a HARQ feedback of a negative response. The configuration enables the terminal 20 to efficiently transmit information relating to the resource from the another terminal 20 via the feedback channel resource.

In addition, according to an embodiment of the present invention, a communication method is provided. The communication method is performed by a terminal. The communication method includes: transmitting information relating to resource selection to another terminal via a resource relating to a HARQ (Hybrid automatic repeat request)

feedback channel; and receiving data from the another terminal via a resource determined based on the information relating to the resource selection, wherein the information relating to the resource selection includes at least one of a sensing result, information indicating a resource determined based on sensing, an indication of re-evaluation or re-selection, or a sidelink grant.

With the above configuration, the terminal 20 can efficiently receive information relating to a resource from the another terminal 20 via the feedback channel resource and can use the appropriate resource at the time of transmission based on the information. That is, in the direct communication between terminals, coordination operation between terminals can be performed to improve the efficiency of the communication.

Supplement to Embodiments

Thus, although embodiments of the present invention have been described, the disclosed invention is not limited to such embodiments, and various modifications, alternations, substitutions, alternatives, etc. will be understood by those skilled in the art. Specific numerical examples have been used to facilitate understanding of the invention, but unless otherwise indicated, they are merely examples and any appropriate values may be used. Classification of items in the above description is not essential to the present invention, and the items described in two or more items may be used in combination as needed, or the items described in one item may be applied to the items described in another item (unless there is a conflict). The functional or processing unit boundaries in the functional block diagram do not necessarily correspond to the physical part boundaries. The operation of the plurality of functions may be performed physically by one component, or the operation of one function may be performed physically by the plurality of components. As for the processing procedure described in the embodiment, the order of the processing may be changed as long as there is no conflict. For convenience of process description, the base station 10 and terminal 20 have been described using a functional block diagram, but such devices may be implemented in hardware, software, or a combination thereof. Software operated by a processor of the base station 10 in accordance with embodiments of the present invention and software operated by a processor of the terminal 20 in accordance with embodiments of the present invention may be stored in random access memory (RFM), flash memory, read only memory (ROM), EPROM, EEPROM, register, hard disk (HDD), removable disk, CD-ROM, database, server, or any other suitable storage medium.

Information may also be communicated in other ways, as well as in the manner/embodiments described in this disclosure. For example, notification of information may be implemented by physical layer signaling (e.g., DCI (Downlink Control Information), UCI (Uplink Control Information), upper layer signaling (e.g., RRC (Radio Resource Control) signaling, MAC (Medium Access Control) signaling, MIB (Master Information Block), SIB (System Information Block)), other signals, or a combination thereof. The RRC signaling may also be referred to as an RRC message, for example, RRC Connection Setup (RRC Connection Setup) message, RRC Connection Reconstruction (RRC Connection Reconstruction) message, or the like.

Each aspect/embodiment described in this disclosure is as follows: LTE (Long Term Evolution), LTE-A (LTE-Advanced), SUPER3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000 UMB (Ultra Mobile Broadband), IEEE 802.11 (Wi-Fi), IEEE 802.16 (WiMAX), IEEE 802.20 (Ultra-WideBand), and Bluetooth (registered trademark), It may be applied to at least one of the systems utilizing other appropriate systems and the next generation systems extended thereon. Multiple systems may also be applied in combination (e.g., at least one of LTE and LTE-A combined with 5G, etc.).

The processing procedures, sequences, flowcharts, etc. of each aspect/embodiment described herein may be reordered unless there is any conflict. For example, the methods described in the present disclosure are presented using exemplary sequences to present elements of the various steps and are not limited to the particular order presented.

The specific operations described herein as performed by the base station 10 may be performed by its upper node in some cases. In a network of one or more network nodes having the base station 10, it will be apparent that various operations performed for communication with the terminal 20 may be performed by at least one of the base station 10 and other network nodes other than the base station 10 (e.g., but not limited to MME, S-GW, etc.). Although the above illustrates that there is only one other network node other than the base station 10, the other network nodes may be a combination of multiple other network nodes (e.g., MME and S-GW).

The information or signals described in this disclosure can be output from a higher layer (or lower layer) to a lower layer (or higher layer). It may be input and output through multiple network nodes.

Input and output information may be stored in a specific location (e.g., memory) or managed using management tables. Input and output information may be overwritten, updated, or added. Output information may be deleted. The input information or the like may be transmitted to another device.

The determination in this disclosure may be made by a value (0 or 1) expressed in 1 bit, by a true or false value (Boolean: true or false), or by a numerical comparison (e.g., a comparison with a predetermined value).

Software should be broadly interpreted to mean, whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and the like.

Software, instructions, information, and the like may also be transmitted and received via a transmission medium. For example, if the software is transmitted from a website, server, or other remote source using at least one of wired technology (such as coaxial cable, fiber optic cable, twisted pair, digital subscriber line (DSL), etc.) and wireless technology (infrared, microwave, etc.), at least one of these wired technology and wireless technology is included within the definition of a transmission medium.

The information, signals and the like described in this disclosure may be represented using any of a variety of different techniques. For example, data, instructions, commands, information, signals, bits, symbols, chips, etc., which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier (CC: Component Carrier) may also be referred to as a carrier frequency, cell, frequency carrier, or the like.

As used in this disclosure, the terms "system" and "network" are used interchangeably.

The information, parameters, and the like described in the present disclosure may also be expressed using absolute values, relative values from predetermined values, or they may be expressed using corresponding separate information. For example, the wireless resources may be those indicated by an index.

The name used for the parameters described above is not restrictive in any respect. In addition, the mathematical equations using these parameters may differ from those explicitly disclosed in this disclosure. Since the various channels (e.g., PUCCH, PDCCH, etc.) and information elements can be identified by any suitable name, the various names assigned to these various channels and information elements are not in any way limiting.

In this disclosure, terms such as "base station (BS)", "wireless base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. The base station may also be referred to as a macrocell, a small cell, a femtocell, a picocell, or the like.

The base station can accommodate one or more (e.g., three) cells. If the base station accommodates a plurality of cells, the entire coverage area of the base station can be divided into a plurality of smaller areas, each of which can also provide communications services via a base station subsystem (e.g., a small indoor base station (RRH: Remote Radio Head)). The term "cell" or "sector" refers to part or all of the coverage area of at least one of the base station and base station subsystem that provides communications services within the coverage.

In this disclosure, terms such as "mobile station (MS)", "user terminal", "user equipment (UE)", "terminal", and the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of the base stations and the mobile station may be referred to as a transmitter, receiver, communication device, or the like. At least one of the base station and the mobile station may be: a device mounted on the mobile body; a mobile body itself; or the like. The mobile body may be a vehicle (e.g., a car, an airplane, etc.), an unmanned mobile (e.g., a drone, an automated vehicle, etc.), or a robot (manned or unmanned). At least one of the base station and the mobile station includes a device that does not necessarily move during communication operations. For example, at least one of the base station and the mobile station may be an IoT (Internet Things) device such as a sensor.

In addition, the base station in the present disclosure may be replaced by the user terminal. For example, various aspects/embodiments of the present disclosure may be applied for a configuration in which communication between base stations and user terminals is replaced by communication between multiple terminals 20 (e.g., may be referred to as D2D (Device-to-Device), V2X (Vehicle-to-Everything), etc.). In this case, the terminal 20 may have the functions provided by the base station 10 described above. The phrases "upstream" and "downstream" may also be replaced by the phrases corresponding to terminal-to-terminal communication (e.g., "side"). For example, an upstream channel, a downstream channel, or the like may be replaced by a side channel.

Similarly, the user terminal in the present disclosure may be replaced by the base station. In this case, the base station may have the functions provided by the user terminal described above.

As used in this disclosure, the terms "determining" and "determining" may encompass a wide variety of operations. "Judgment" includes, for example, judging, calculating, computing, processing, deriving, investigating, looking up (searching, inquiring) (e.g., searching in a table, database, or other data structure), ascertaining, and so forth. "Judgment" and "decision" may also include receiving (e.g., receiving information), transmitting (e.g., sending information), input, output, and accessing (e.g., accessing data in memory) as "judged" and "determined", and the like. "Judgment" and "decision" may also include "judgment" and "decision" regarding matters such as resolving, selecting, choosing, establishing, comparing, etc. That is, the "judgment" and the "decision" may include deeming some action to be "judgment" and "determination". "Decision" may be read as "assuming," "expecting" or "considering", etc.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency domain, the microwave region, and the light (both visible and invisible) region.

The reference signal may be abbreviated as RS (Reference Signal) or may be referred to as a pilot, depending on the standards applied.

As used in this disclosure, the expression "based on" does not mean "solely" unless otherwise specified. In other words, the expression "based on" means both "solely" and "at least based on".

Any reference to an element using a designation such as "first" or "second" as used in the present disclosure does not generally limit the amount or order of those elements. These designations can be used in the present disclosure as a convenient way to distinguish between two or more elements. Thus, references to the first and second elements do not imply that only two elements may be employed or that the first element must in some way precede the second element.

"Means" in the configuration of each of the above devices may be replaced by "parts," "circuits," "devices," etc.

When the terms "include", "including" and variations thereof are used in the present disclosure, these terms are intended to be comprehensive as well as the term "comprising". Moreover, the term "or" as used in this disclosure is not intended to be an exclusive-OR.

The wireless frame may consist of one or more frames in the time domain. Each frame or frames in the time domain may be referred to as subframes. The subframe may further comprise one or more slots in the time domain. The subframe may be a fixed length of time (e.g., 1 ms) independent of the numerology.

The numerology may be a communication parameter that is applied to at least one of the transmission and reception of a signal or channel. The numerology may indicate at least one of, for example, subcarrier spacing (SCS), bandwidth, symbol length, cyclic prefix length, transmit time interval (TTI), number of symbols per TTI, wireless frame configuration, certain filtering processing performed by the transceiver in the frequency domain, specific windowing processing performed by the transceiver in the time domain, and the like.

The slot may be composed of one or more symbols in the time domain, such as OFDM (Orthogonal Frequency Division Multiplexing) symbols, SC-FDMA (Single Carrier Frequency Division Multiple Access) symbols, and the like. The slot may be in time units based on a numerology.

The slots may include a plurality of minislots. Each minislot may be comprised of one or more symbols in the time domain. The minislot may also be referred to as a subslot. The minislots may consist of fewer symbols than the slots. A PDSCH (or PUSCH) transmitted in time units greater than a minislot may be called a PDSCH (or PUSCH) mapping type A. PDSCH (or PUSCH) transmitted using minislots may be referred to as PDSCH (or PUSCH) mapping type B.

Radio frames, subframes, slots, minislots and symbols all represent time units for transmitting signals. Radio frames, subframes, slots, minislots and symbols, respectively, may be designated separately.

For example, one subframe may be referred to as a transmission time interval (TTI), multiple consecutive subframes may be referred to as a TTI, and one slot or one minislot may be referred to as a TTI. That is, at least one of the subframes and the TTI may be a subframe (1 ms) in an existing LTE, a period shorter than 1 ms (e.g., 1-13 symbols), or a period longer than 1 ms. The unit representing the TTI may be referred to as a slot, a minislot, or the like, rather than a subframe.

The TTI refers, for example, to the minimum time unit for scheduling in wireless communication. For example, in an LTE system, a base station schedules each terminal 20 to allocate wireless resources (such as frequency bandwidth, transmit power, etc. that can be used in each terminal 20) in TTI units. The definition of TTI is not limited to this.

The TTI may be a transmission time unit, such as a channel-encoded data packet (transport block), code block, codeword, or the like, or may be a processing unit, such as a scheduling or link adaptation. When a TTI is provided, the time interval (e.g., the number of symbols) during which the transport block, code block, codeword, or the like is actually mapped may be shorter than the TTI.

If one slot or one minislot is referred to as a TTI, one or more TTIs (i.e., one or more slots or one or more minislots) may be the minimum time unit for scheduling. The number of slots (minislots) constituting the minimum time unit of the scheduling may also be controlled.

A TTI having a time length of 1 ms may be referred to as a TTI (usually a TTI in LTE Rel.8-12), a normal TTI, a long TTI, a subframe, a normal subframe, a long subframe, a slot, and the like. A TTI that is typically shorter than a TTI may be referred to as a shortened TTI, a short TTI, a partial TTI (partial or fractional TTI), a shortened subframe, a short subframe, a minislot, a subslot, a slot, or the like.

The long TTI (e.g., usually TTI, subframe, etc.) may be interpreted as a TTI having a time length exceeding 1 ms, and the short TTI (e.g., shortened TTI, etc.) may be interpreted as a TTI having a TTI length less than the TTI length of the long TTI and a TTI length greater than 1 ms.

Resource blocks (RBs) are time domain and frequency domain resource allocation units and may include one or more consecutive subcarriers in the frequency domain. The number of subcarriers included in the RB may be the same, regardless of the numerology, for example, 12. The number of subcarriers included in the RB may be determined on the basis of numerology.

The time domain of the RB may also include one or more symbols, which may be 1 slot, 1 minislot, 1 subframe, or 1 TTI in length. One TTI, one subframe, etc., may each consist of one or more resource blocks.

Note that one or more RBs may be referred to as physical resource blocks (PRB: Physical RB), subcarrier groups (SCG: Sub-Carrier Group), resource element groups (REG: Resource Element Group), PRB pairs, RB pairs, and the like.

The resource block may also consist of one or more resource elements (RE). For example, 1 RE may be a wireless resource area of one sub-carrier and one symbol.

The bandwidth portion (BWP: Bandwidth Part), which may also be referred to as a sub-bandwidth, etc.) may represent a subset of consecutive common RB (common resources blocks) for a given numerology in a carrier. Here, the common RB may be identified by an index of RB relative to the common reference point of the carrier. A PRB is defined in a BWP and may be numbered within that BWP.

BWP may include BWP (UL BWP) for UL and BWP (DL BWP) for DL. One or more BWPs may be configured in one carrier for the terminal 20.

At least one of the configured BWPs may be active, and the terminal 20 may not assume to transmit or receive predetermined signals/channels outside the active BWP. The terms "cell" and "carrier" in this disclosure may be replaced by "BWP."

Structures such as radio frames, subframes, slots, minislots, and symbols described above are exemplary only. For example, the number of subframes included in a wireless frame, the number of slots per subframe or wireless frame, the number of minislots included in the slot, the number of symbols and RBs included in the slot or minislot, the number of subcarriers included in the RB, the number of symbols in the TTI, the symbol length, the length of the cyclic prefix (CP; Cyclic Prefix), and the like may vary.

In the present disclosure, where an article is added by translation, for example a, an, and the in English language, the disclosure may include that the noun following these articles is plural.

In this disclosure, the term "A and B are different" may mean "A and B are different from each other." Incidentally, the term may mean "A and B are different from C." Terms such as "separated" or "combined" may be interpreted as well as "different".

The aspects/embodiments described in the present disclosure may be used alone, used in combination, or switched with implementation. Notice of a given information (e.g.

"X" notice) may also be given by implication (e.g. "no notice of the given information"), and not explicitly.

In the present disclosure, PSFCH is an example of a HARQ feedback channel.

While the present disclosure has been described in detail above, those skilled in the art will appreciate that the present disclosure is not limited to the embodiments described in the present disclosure. The disclosure may be implemented as modifications and variations without departing from the spirit and scope of the disclosure as defined by the claims. Accordingly, the description of the present disclosure is for illustrative purposes only and is not intended to have any restrictive meaning with respect to the present disclosure.

This international patent application claims priority to Japanese Patent Application No. 2020-138279, filed Aug. 18, 2020, and the entire contents of Japanese Patent Application No. 2020-138279 are hereby incorporated by reference.

DESCRIPTION OF THE REFERENCE NUMERALS

10 Base station
110 Transmitter
120 Receiver
130 Configuration unit
140 Control unit
20 Terminal
210 Transmitter
220 Receiver
230 Configuration unit
240 Control unit
1001 Processor
1002 Storage device
1003 Auxiliary storage device
1004 Communication device
1005 Input device
1006 Output device

The invention claimed is:

1. A terminal comprising:
a receiver configured to receive a shared channel transmitted from another terminal;
a control unit configured to identify a time resource that is configured for a specific channel, a first frequency resource that is configured for the specific channel used for transmission of a response related to a retransmission control of the shared channel, and a second frequency resource that is configured for the specific channel used for transmission of information related to selection of a resource used for transmission of the shared channel from the another terminal; and
a transmitter configured to transmit the information related to selection of the resource to the another terminal in the time resource via the specific channel based on the second frequency resource that is different from the first frequency resource,
wherein the time resource is configured based on a parameter indicating a period of the specific channel, and
the first frequency resource is a resource block configured based on a parameter indicating a frequency domain of the specific channel and the second frequency resource is a resource block other than the configured resource block.

2. The terminal as claimed in claim 1, wherein
the control unit determines a code resource for the specific channel used for transmission of the information related to selection of the resource.

3. The terminal as claimed in claim 2, wherein
the code resource is determined based on a parameter related to a cyclic shift of the specific channel.

4. The terminal as claimed in claim 1, wherein
the specific channel is a PSFCH (Physical Sidelink Feedback Channel).

5. A terminal comprising:
a transmitter configured to transmit a shared channel to another terminal;
a receiver configured to receive, in a time resource configured for a specific channel, information related to selection of a resource used for transmission of the shared channel via the specific channel by using a second frequency resource that is different from a first frequency resource configured for the specific channel used for transmission of a response related to a retransmission control of the shared channel; and
a control unit configured to reselect a resource used for transmission of the shared channel based on the information related to selection of the resource,
wherein the time resource is configured based on a parameter indicating a period of the specific channel, and
the first frequency resource is a resource block configured based on a parameter indicating a frequency domain of the specific channel and the second frequency resource is a resource block other than the configured resource block.

6. A system comprising:
a first terminal; and
a second terminal,
wherein the first terminal includes:
a receiver configured to receive a shared channel transmitted from the second terminal;
a control unit configured to identify a time resource that is configured for a specific channel, a first frequency resource that is configured for the specific channel used for transmission of a response related to a retransmission control of the shared channel, and a second frequency resource that is configured for the specific channel used for transmission of information related to selection of a resource used for transmission of the shared channel from the second terminal; and
a transmitter configured to transmit the information related to selection of the resource to the second terminal in the time resource via the specific channel based on the second frequency resource that is different from the first frequency resource,
wherein the time resource is configured based on a parameter indicating a period of the specific channel, and
the first frequency resource is a resource block configured based on a parameter indicating a frequency domain of the specific channel and the second frequency resource is a resource block other than the configured resource block, and
wherein the second terminal includes a transmitter configured to transmit the shared channel to the first terminal.

7. A communication method of a terminal, the communication method comprising:
receiving a shared channel transmitted from another terminal;

identifying a time resource that is configured for a specific channel, a first frequency resource that is configured for the specific channel used for transmission of a response related to a retransmission control of the shared channel, and a second frequency resource that is configured for the specific channel used for transmission of information related to selection of a resource used for transmission of the shared channel from the another terminal; and transmitting the information related to selection of the resource to the another terminal in the time resource via the specific channel by using the second frequency resource that is different from the first frequency resource, wherein the time resource is configured based on a parameter indicating a period of the specific channel, and the first frequency resource is a resource block configured based on a parameter indicating a frequency domain of the specific channel and the second frequency resource is a resource block other than the configured resource block.

8. A communication method of a terminal, the communication method comprising:

transmitting a shared channel to another terminal;

receiving, in a time resource configured for a specific channel, information related to selection of a resource used for transmission of the shared channel via the specific channel by using a second frequency resource that is different from a first frequency resource configured for the specific channel used for transmission of a response related to a retransmission control of the shared channel; and reselecting a resource used for transmission of the shared channel based on the information related to selection of the resource, wherein the time resource is configured based on a parameter indicating a period of the specific channel, and the first frequency resource is a resource block configured based on a parameter indicating a frequency domain of the specific channel and the second frequency resource is a resource block other than the configured resource block.

* * * * *